US012238679B2

United States Patent
Jung et al.

(10) Patent No.: US 12,238,679 B2
(45) Date of Patent: Feb. 25, 2025

(54) METHOD AND DEVICE FOR PAGING TRANSMISSION AND RECEPTION OF TERMINAL SUPPORTING MULTIPLE SIMS IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 17/633,761

(22) PCT Filed: Aug. 14, 2020

(86) PCT No.: PCT/KR2020/010845
§ 371 (c)(1),
(2) Date: Jun. 13, 2022

(87) PCT Pub. No.: WO2021/029730
PCT Pub. Date: Feb. 18, 2021

(65) Prior Publication Data
US 2023/0189209 A1    Jun. 15, 2023

(30) Foreign Application Priority Data
Aug. 14, 2019    (KR) .......................... 10-2019-0099596

(51) Int. Cl.
*H04W 68/02*    (2009.01)
*H04W 48/12*    (2009.01)
(Continued)

(52) U.S. Cl.
CPC ........... *H04W 68/02* (2013.01); *H04W 48/12* (2013.01); *H04W 76/28* (2018.02); *H04W 88/06* (2013.01)

(58) Field of Classification Search
CPC ..... H04W 48/12; H04W 68/02; H04W 76/28; H04W 88/06
See application file for complete search history.

(56) References Cited

U.S. PATENT DOCUMENTS

| 10,362,623 B2 | 7/2019 | Liang et al. |
| 2014/0106750 A1 | 4/2014 | Roullier et al. |
(Continued)

FOREIGN PATENT DOCUMENTS

| KR | 10-2019-0002434 A | 1/2019 |
| KR | 10-2021-0007285 A | 1/2021 |
| WO | 2019/099661 A1 | 5/2019 |

OTHER PUBLICATIONS

Qualcomm Incorporated et al. "Avoidance of paging collisions to minimize outage of services", 3GPP Draft; S2-174243-PAGINGCOLLISION_V8, 3rd Generation Partnership Project (3GPP), Mobile Competence Centre ; 650, Route Des Lucioles ; F-06921 Sophia-Antipolis Cedex ; France vol. SA WG2, no. San Jose Del Cabo; Jun. 26, 2017-Jun. 30, 2017 Jun. 25, 2017 (Jun. 25, 2017), XP051303098.
(Continued)

*Primary Examiner* — Pao Sinkantarakorn
(74) *Attorney, Agent, or Firm* — Jefferson IP Law, LLP

(57) ABSTRACT

The present disclosure relates to a communication technique for combining an IoT technology with a 5G communication system for supporting a higher data transmission rate than a 4G system, and a system for same. The present disclosure may be applied to intelligent services (for example, smart homes, smart buildings, smart cities, smart or connected cars, healthcare, digital education, retail businesses, security and safety-related services, etc.) based on 5G communication technology and IoT-related technology. According to an embodiment of the present disclosure, a method to be performed by a terminal of a wireless communication system is provided. The method is characterized by including the steps of: receiving first system information through a cell of a first base station; identifying whether a first paging occasion confirmed on the basis of the first system information overlaps a second paging occasion for a second base station; transmitting a message to the first base station when the first paging occasion overlaps the second paging occasion and an indicator indicating that the cell of the first base station supports paging adjustment is included in the first system information, said message including at least one first parameter related to the paging adjustment; receiving a message, including at least one second parameter deter- (Continued)

mined on the basis of the at least one first parameter, from the first base station; and receiving a paging message on the basis of the at least one second parameter.

10 Claims, 13 Drawing Sheets

(51) Int. Cl.
*H04W 76/28* (2018.01)
*H04W 88/06* (2009.01)

(56) References Cited

U.S. PATENT DOCUMENTS

| | | |
|---|---|---|
| 2014/0128082 A1 | 5/2014 | Chirayil |
| 2018/0343638 A1 | 11/2018 | Balasubramanian et al. |
| 2020/0260429 A1 | 8/2020 | Blankenship et al. |
| 2020/0329455 A1* | 10/2020 | Ryu ............... H04W 76/28 |
| 2022/0159617 A1* | 5/2022 | Shih ............... H04W 68/005 |
| 2022/0248369 A1* | 8/2022 | Wu ............... H04W 68/02 |
| 2022/0264523 A1* | 8/2022 | Fehrenbach ......... H04W 88/06 |

OTHER PUBLICATIONS

Vivo: "vivo views on NR Rel-17", 3GPP Draft; RP-190833 Vivo Views on REL-17, 3rd Generation Partnership Project (3GPP), Mobile Competence Centre ; 650, Route Des Lucioles ; F-06921 Sophia-Antipolis Cedex ; France vol. TSG RAN, no. Newport Beach, USA; Jun. 3, 2019-Jun. 6, 2019 Jun. 2, 2019 (Jun. 2, 2019), XP051746117.
Extended European Search Report dated Jul. 25, 2022, issued in European Application No. 20 85 1486.
Vivo et al., "Considerations on multi-SIM study in Ran", RP-191304,3GPP TSG RAN Meeting #84, Newport Beach, USA, May 27, 2019.
Vivo, "Observations on RAN impacts for RAN related objectives in SID, multi-SIM", S2-1905784, SA WG2 Meeting #133, Reno, NV, USA, May 7, 2019.
3rd Generation Partnership Project; Technical Specification TS 38.304 (v 15.4.0) Group Radio Access Network; NR; User Equipment (UE) procedures in Idle mode and RRC, Inactive state (Release 15) (Jun. 2019).
International Search Report dated Nov. 20, 2020, Issued in International application No. PCT/KR2020/010845.
European Office Action dated Jul. 8, 2024, issued in European Application No. 20 851 486.9.

\* cited by examiner

METHOD AND DEVICE FOR PAGING TRANSMISSION AND RECEPTION OF TERMINAL SUPPORTING MULTIPLE SIMS IN NEXT-GENERATION MOBILE COMMUNICATION SYSTEM

TECHNICAL FIELD

The disclosure relates to a method and apparatus for transmitting and receiving paging of a terminal in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a Beyond 4G Network or a Post LTE System. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as sensing technology, wired/wireless communication and network infrastructure, service interface technology, and security technology, have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine to machine (M2M) communication, and machine type communication (MTC) may be implemented by beamforming, MIMO, and array antennas. Application of a cloud radio access network (RAN) as the above-described Big Data processing technology may also be considered to be as an example of convergence between the 5G technology and the IoT technology.

DISCLOSURE OF INVENTION

Technical Problem

The disclosure provides a method and apparatus for preventing a paging collision of a terminal supporting multi-SIM in a next-generation mobile communication system.

Solution to Problem

In order to solve the above-mentioned problem, a method performed by a terminal according to an embodiment of the disclosure includes receiving first system information through a cell of a first base station; identifying whether a first paging occasion identified based on the first system information and a second paging occasion for a second base station overlap each other; transmitting a message including at least one first parameter related to a paging adjustment to the first base station when the first paging occasion and the second paging occasion overlap each other and the first system information includes an indication indicating that the cell of the first base station supports the paging adjustment; receiving a message including at least one second parameter determined based on the at least one first parameter from the first base station; and receiving a paging message based on the at least one second parameter. In addition, a method performed by a first base station according to an embodiment of the disclosure includes transmitting first system information through a cell of the first base station; receiving a message including at least one first parameter related to a paging adjustment from a terminal when a first paging occasion identified based on the first system information and a second paging occasion for a second base station overlap each other and the first system information includes an indication indicating that the cell of the first base station supports the paging adjustment; obtaining at least one second parameter based on the at least one first parameter; transmitting a message including the at least one second parameter to the terminal; and transmitting a paging message based on the at least one second parameter to the terminal.

In addition, a terminal according to an embodiment of the disclosure includes a transceiver; and a controller configured to control the transceiver to receive first system information through a cell of a first base station, to identify whether a first paging occasion identified based on the first system information and a second paging occasion for a second base station overlap each other, to control the transceiver to transmit a message including at least one first parameter related to a paging adjustment to the first base station when the first paging occasion and the second paging occasion overlap each other and the first system information includes an indication indicating that the cell of the first base station supports the paging adjustment, to control the transceiver to receive a message including at least one second parameter determined based on the at least one first parameter from the first base station, and to control the transceiver to receive a paging message based on the at least one second parameter.

In addition, a first base station according to an embodiment of the disclosure includes a transceiver; and a controller configured to control the transceiver to transmit first system information through a cell of the first base station, to control the transceiver to receive a message including at least one first parameter related to a paging adjustment from a terminal when a first paging occasion identified based on the first system information and a second paging occasion for a second base station overlap each other and the first system information includes an indication indicating that the cell of the first base station supports the paging adjustment, to obtain at least one second parameter based on the at least one first parameter, to control the transceiver to transmit a message including the at least one second parameter to the terminal, and to control the transceiver to transmit a paging message based on the at least one second parameter to the terminal.

Advantageous Effects of Invention

According to the disclosure, a terminal that supports multi-SIM in a next-generation mobile communication system can receive paging without collision, and thus can efficiently communicate with a network.

The effects that can be obtained from the disclosure are not limited to the above-mentioned effects, and other effects not mentioned are clearly understood from the following description by those of ordinary skill in the art to which the disclosure belongs.

BRIEF DESCRIPTION OF DRAWINGS

The above and other aspects, features and advantages of embodiments of the disclosure will be more apparent from the following detailed description, taken in conjunction with the accompanying drawings.

MODE FOR THE INVENTION

Figure 1:
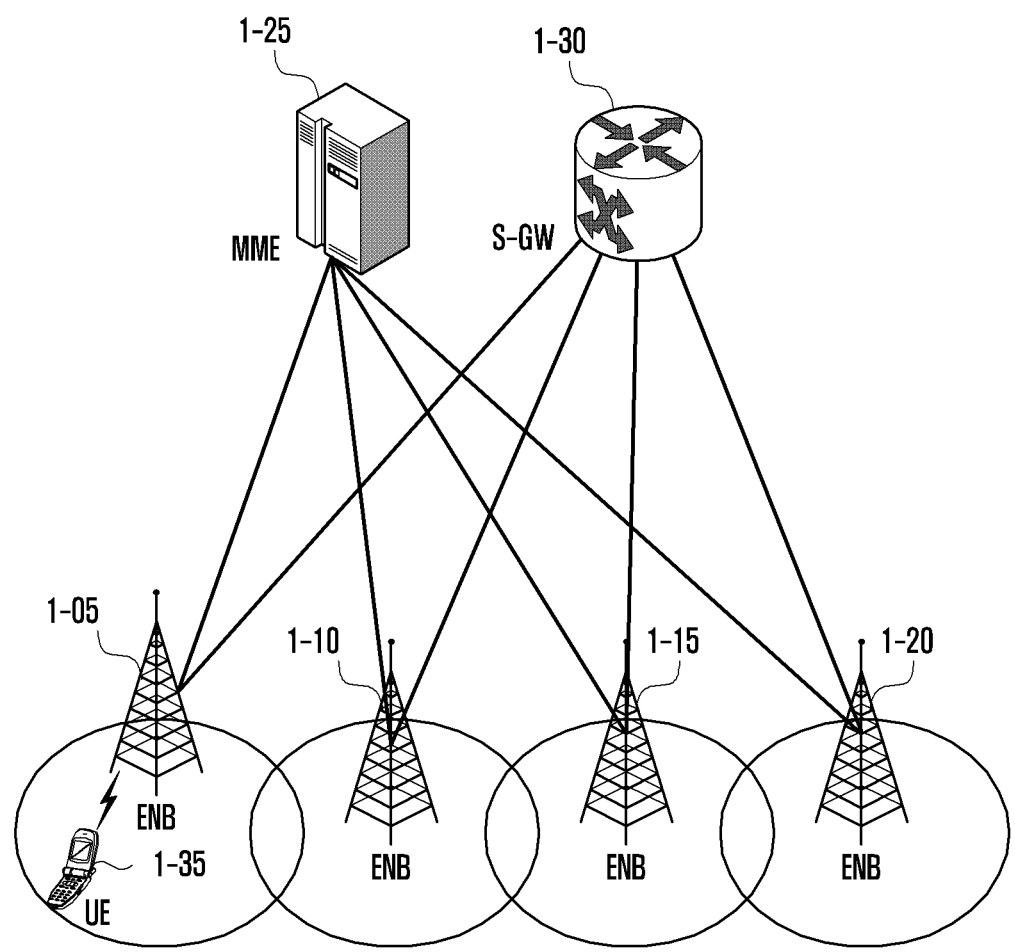
FIG. 1 is a diagram illustrating a structure of a long term evolution (LTE) system according to an embodiment of the disclosure.

Hereinafter, the operation principle of the disclosure will be described in detail with reference to the accompanying drawings. In describing the disclosure below, a detailed description of related known configurations or functions will be omitted when it is determined to unnecessarily obscure the subject matter of the disclosure. In addition, terms used hereunder have been defined in consideration of functions in the disclosure. Such terms may vary depending on a user's or operator's intention or custom, so their definitions should be determined based on the contents of this specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

In the disclosure, a term used for identifying an access node, terms indicating network entities, terms indicating messages, a term indicating an interface between network entities, terms indicating various pieces of identification information, and the like are used for convenience of description. Therefore, the disclosure is not be limited by such terms, and other alternative terms having equivalent technical meanings may be used.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s). In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

For convenience of description, the disclosure uses terms and names defined in the 3rd generation partnership project long term evolution (3GPP LTE). However, the disclosure is not limited by such terms and names, and may be equally applied to systems that comply with other standards. In the disclosure, eNB and gNB may be interchangeably used. That is, a base station described as eNB may indicate gNB.

FIG. 1 is a diagram illustrating a structure of a long term evolution (LTE) system to according to an embodiment of the disclosure.

With reference to FIG. 1, as illustrated, a radio access network of the LTE system is configured with next-generation base stations (an evolved node B (ENB), a Node B, or a base station) 1-05, 1-10, 1-15, and 1-20, a mobility management entity (MME) 1-25, and a serving-gateway (S-GW) 1-30. A user equipment (UE) (or a terminal) 1-35 accesses an external network via the ENB 1-05 to 1-20 and the S-GW 1-30.

In FIG. 1, the ENB 1-05 to 1-20 corresponds to a legacy node B in a universal mobile telecommunications system (UMTS). The ENB is connected to the UE 1-35 via a wireless channel and performs a more complicated role than the legacy node B. In the LTE system, real-time services, such as a voice over IP (VoIP) via an Internet protocol, and all user traffic are provided via a shared channel Therefore, a device that performs scheduling by collecting state information of UEs, such as a buffer state, an available transmission power state, a channel state, and the like, is needed, and the ENBs 1-05 to 1-20 are in charge of scheduling. One ENB generally controls a plurality of cells. For example, in order to implement a transmission rate of 100 Mbps, the LTE system uses an orthogonal frequency division multiplexing (OFDM) as a wireless access technology in a bandwidth of 20 MHz. In addition, an adaptive modulation & coding (AMC) scheme that determines a modulation scheme and a channel coding rate is applied based on the channel state of the UE. The S-GW 1-30 is a device for providing a data bearer, and generates or removes the data bearer under the control of the MME 1-25. The MME is a device being in charge of various control functions as well as a mobility management function associated with the UE, and is connected to a plurality of base stations.

Figure 2:
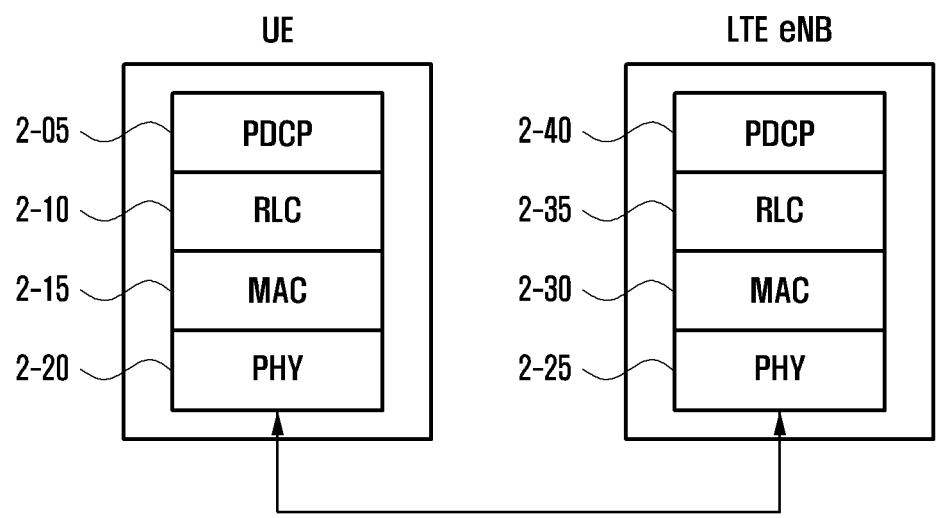
FIG. 2 is a diagram illustrating a structure of a radio protocol in an LTE system according to an embodiment of the disclosure.

FIG. 2 is a diagram illustrating a structure of a radio protocol in an LTE system according to an embodiment of the disclosure.

With reference to FIG. 2, the radio protocol of the LTE system includes, for each of a UE and an ENB, a packet data convergence protocol (PDCP) 1b-05 and 1b-40, a radio link control (RLC) 2-10 and 2-35, and a medium access control (MAC) 2-15 and 2-30. The PDCP 2-05 and 2-40 takes charge of IP header compression/decompression and the like. The main functions of the PDCP are summarized as follows.

Header compression and decompression: robust header compression (ROHC) only

Transfer of user data

In-sequence delivery (In-sequence delivery of upper layer packet data units (PDUs) at PDCP re-establishment procedure for radio link control acknowledged mode (RLC AM))

Reordering (For split bearers in DC (only support for RLC AM): PDCP PDU routing for transmission and PDCP PDU reordering for reception)

Duplicate detection (Duplicate detection of lower layer service data units (SDUs) at PDCP re-establishment procedure for RLC AM)

Retransmission (Retransmission of PDCP SDUs at handover and, for split bearers in DC, of PDCP PDUs at PDCP data-recovery procedure, for RLC AM)

Ciphering and deciphering

Timer-based SDU discard (Timer-based SDU discard in uplink)

The RLC 2-10 and 2-35 reconfigures a PDCP packet data unit (PDU) into an appropriate size and performs automatic repeat query (ARQ) and the like. The main functions of an RLC are summarized as follows.

Transfer of data (Transfer of upper layer PDUs)

ARQ (Error correction through ARQ (only for AM data transfer))

Concatenation, segmentation, and reassembly (Concatenation, segmentation and reassembly of RLC SDUs (only for un-acknowledge mode (UM) and AM data transfer))

Re-segmentation (Re-segmentation of RLC data PDUs (only for AM data transfer))

Reordering (Reordering of RLC data PDUs (only for UM and AM data transfer)

Duplicate detection (Duplicate detection (only for UM and AM data transfer))

Error detection (Protocol error detection (only for AM data transfer))

RLC SDU discard (RLC SDU discard (only for UM and AM data transfer))

RLC re-establishment

The MAC 2-15 and 2-30 is connected to various RLC layer devices configured for one UE, and performs multiplexing of RLC PDUs to a MAC PDU and demultiplexing of RLC PDUs from a MAC PDU. The main functions of the MAC are summarized as follows.

Mapping (Mapping between logical channels and transport channels)
    Multiplexing and demultiplexing (Multiplexing/demultiplexing of MAC SDUs belonging to one or different logical channels into/from transport blocks (TB) delivered to/from the physical layer on transport channels)
    Scheduling information reporting
    Hybrid automatic repeat request (HARQ) (error correction through HARQ)
    Priority handling between logical channels (Priority handling between logical channels of one UE)
    Priority handling between UEs (Priority handling between UEs by means of dynamic scheduling)
    Multimedia broadcast/multicast service (MBMS) service identification
    Transport format selection
    Padding The physical (PHY) layer 2-20 and 2-25 performs an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

Figure 3:
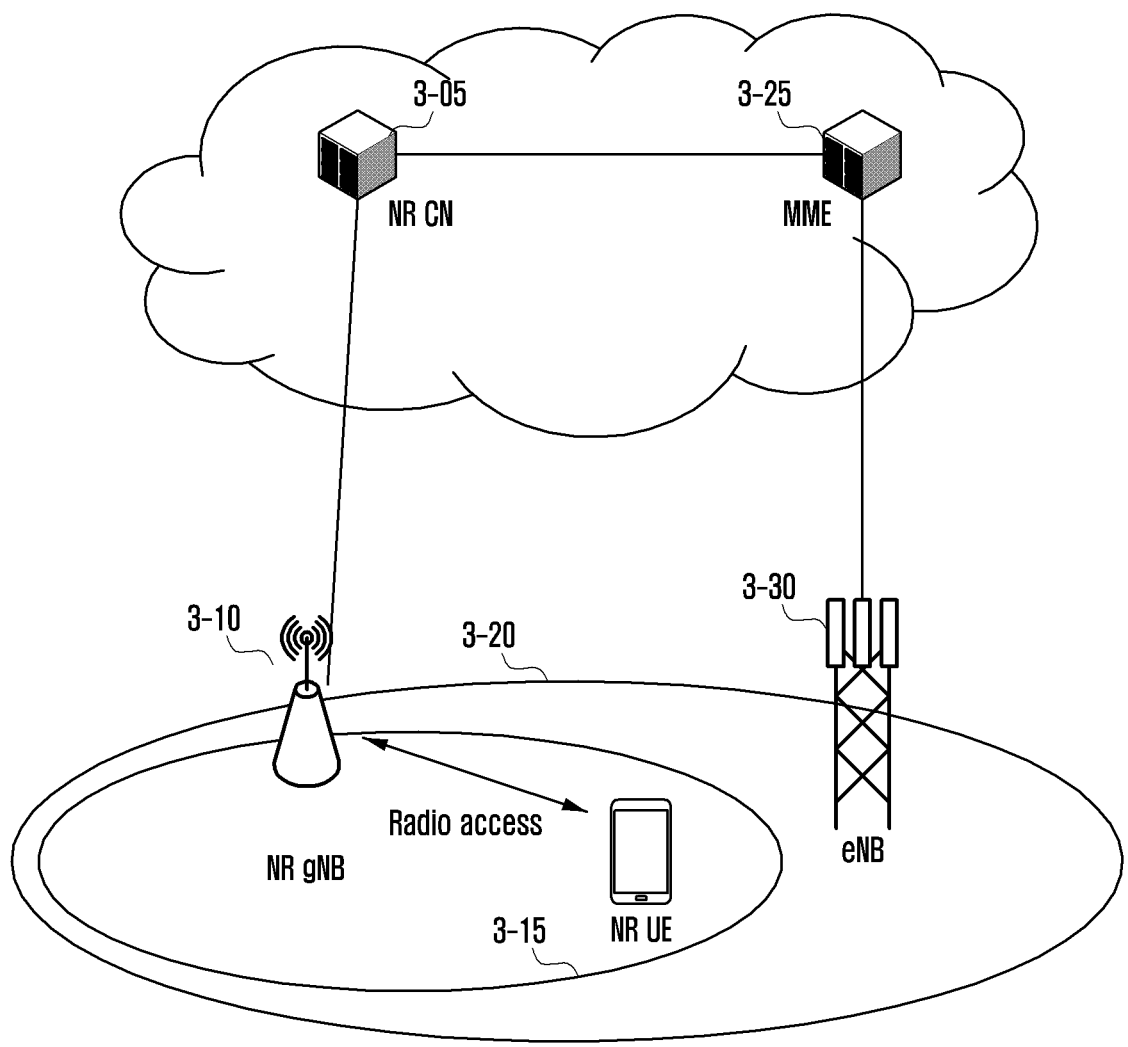
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

With reference to FIG. 3, as illustrated, a radio access network of the next-generation mobile communication system (hereinafter, NR or 5G) is configured with a next-generation base station (a new radio node B (NR gNB) or an NR base station) 3-10 and a new radio core network (NR CN) 3-05. A user equipment (a new radio user equipment (NR UE) or a terminal) 3-15 accesses an external network 3-35 via the NR gNB 3-10 and the NR CN 3-05.

In FIG. 3, the NR gNB 3-10 corresponds to an evolved Node B (eNB) in the legacy LTE system. The NR gNB is connected to the NR UE 3-15 via a wireless channel and may provide a better service compared to the legacy node B. In the next-generation mobile communication system, all user traffics are serviced via a shared channel. Therefore, a device that performs scheduling by collecting state information of UEs, such as a buffer state, an available transmission power state, a channel state, and the like, is needed, and the NR NB 3-10 takes charge of scheduling. One NR gNB generally controls a plurality of cells. In order to implement high-speed data transmission compared to the currently used LTE, a bandwidth greater than the legacy maximum bandwidth may be needed, and beamforming technology may be further used in addition to an orthogonal frequency division multiplexing (OFDM) used as a radio access technology. Also, an adaptive modulation & coding (AMC) scheme that determines a modulation scheme and a channel coding rate is applied based on the channel state of a UE. The NR CN 3-05 performs functions of mobility support, bearer setup, quality of service (QoS) setup, and the like. The NR CN 3-05 is a device that is in charge of various control functions in addition to a mobility management function associated with the UE 3-15, and is connected to a plurality of base stations. Also, the next-generation mobile communication system is capable of interoperating with the legacy LTE system, and the NR CN 3-05 is connected to the MME 3-25 via a network interface. The MME 3-25 is connected to the eNB 3-30 which is a legacy base station.

Figure 4:
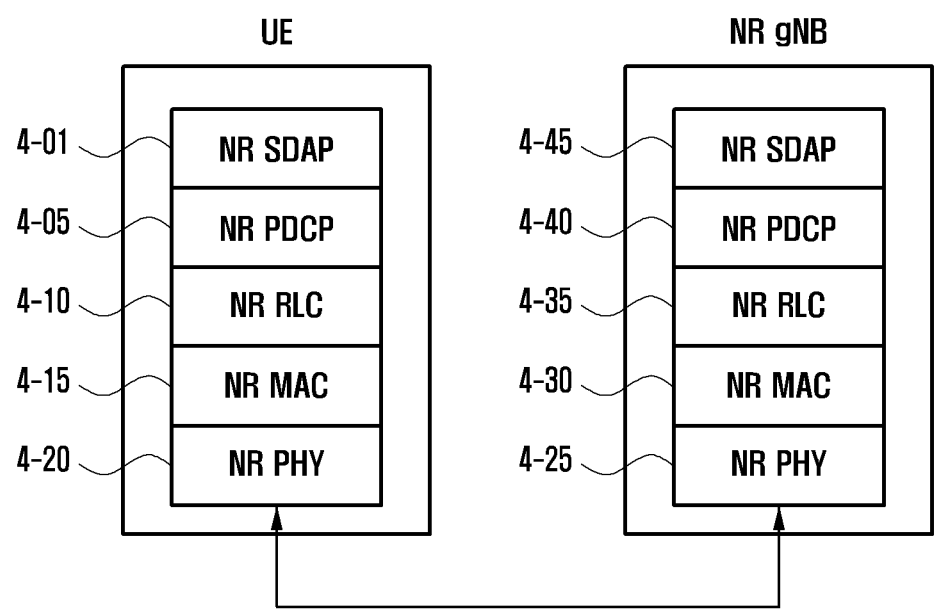
FIG. 4 is a diagram illustrating a structure of a radio protocol in a next-generation mobile communication system according to an embodiment of the disclosure.

FIG. 4 is a diagram illustrating a structure of a radio protocol in a next-generation mobile communication system according to an embodiment of the disclosure.

With reference to FIG. 4, the radio protocol of the next-generation mobile communication system is configured with an NR service data adaptation protocol (SDAP) 4-01 and 4-45, an NR PDCP 4-05 and 4-40, an NR RLC 4-10 and 4-35, and an NR MAC 4-15 and 4-30 for each of a UE and an NR base station.

The main functions of the NR SDAP 4-01 and 4-45 may include some of the following functions.

Transfer of user data (Transfer of user plane data)
    Mapping between a QoS flow and a data radio bearer (DRB) for both downlink (DL) and uplink (UL)
    Marking QoS flow identify (ID) for both DL and UL (Marking QoS flow ID in both DL and UL packets)
    Mapping reflective QoS flow to DRB for the UL SDAP PDUs (Reflective QoS flow to DRB mapping for the UL SDAP PDUs)

A UE may receive, via an radio resource control (RRC) message, a configuration associated with whether to use a header of the SDAP layer device or whether to use a function of the SDAP layer device, for each PDCP layer device, or for each bearer, or for each logical channel. When a SDAP header is configured, the UE is directed, by a one-bit non-access stratum (NAS) reflective QoS indicator (NAS reflective QoS) and a one-bit AS reflective QoS indicator (AS reflective QoS) of the SDAP header, to update or reconfigure mapping information between a data bearer and a QoS flow of an uplink and a downlink. The SDAP header may include QoS flow ID information indicating QoS. The QoS information may be used as data processing priority for supporting smooth services, scheduling information or the like.

The main functions of the NR PDCP 4-05 and 4-40 may include some of the following functions.

Header compression and decompression: ROHC only
    Transfer of user data
    In-sequence delivery (In-sequence delivery of upper layer PDUs)
    Out-of-sequence delivery (Out-of-sequence delivery of upper layer PDUs)
    Reordering (PDCP PDU reordering for reception)
    Duplicate detection (Duplicate detection of lower layer SDUs)
    Retransmission (Retransmission of PDCP SDUs)
    Ciphering and deciphering
    Timer-based SDU discard (Timer-based SDU discard in uplink)

In the above, the reordering function of the NR PDCP refers to a function of sequentially reordering PDCP PDUs received from a lower layer according to a PDCP sequence number (SN). The reordering function may include a function of sequentially transferring reordered data to a higher layer, may include a function of immediately transferring data without considering order, may include a function of performing reordering and recording lost PDCP PDUs, may include a function of reporting the states of lost PDCP PDUs to a transmission side, and may include a function of requesting retransmission of lost PDCP PDUs.

The main functions of the NR RLC 4-10 and 4-35 may include some of the following functions.

Transfer of data (Transfer of upper layer PDUs)
    In-sequence delivery (In-sequence delivery of upper layer PDUs)
    Out-of-sequence delivery (Out-of-sequence delivery of upper layer PDUs)

ARQ (Error correction through ARQ)

Concatenation, segmentation, and reassembly (Concatenation, segmentation and reassembly of RLC SDUs)

Re-segmentation (Re-segmentation of RLC data PDUs)

Reordering (Reordering of RLC data PDUs)

Duplicate detection

Error detection (Protocol error detection)

RLC SDU discard

RLC re-establishment

In the above, the in-sequence delivery function of the NR RLC device refers to a function of sequentially transferring RLC SDUs, received from a lower layer, to a higher layer. The in-sequence delivery function may include a function of reassembling RLC SDUs, which are segmented from an originally single RLC SDU, and transferring an RLC SDU, may include a function of reordering received RLC PDUs based on an RLC sequence number (SN) or PDCP sequence number (SN), may include a function of performing reordering and recording lost RLC PDUs, may include a function of reporting the states of lost RLC PDUs to a transmission side, may include a function of requesting retransmission of lost RLC PDUs, may include a function of sequentially transferring, to a higher layer, only RLC SDUs before a lost RLC SDU if a lost RLC SDU exists, may include a function of sequentially transferring, to a higher layer, all RLC SDU received before a timer starts if the timer expires although a lost RLC SDU exists, or may include a function of sequentially transferring, to a higher layer, all RLC SDUs received up to date, if a predetermined timer expires, although a lost RLC SDU exists. The RLC PDUs may be processed in order of arrival (irrespective of a sequence number) and may be transferred to a PDCP device randomly (out-of sequence delivery). In the case of segments, a single RLC PDU is reconfigured by receiving segments which are stored in a buffer or are to be received in the future, and the RLC PDU may be transferred to the PDCP device. The NR RLC layer may not include a concatenation function, and the function may be performed by the NR MAC layer or may be replaced with the multiplexing function of the NR MAC layer.

In the above, the out-of-sequence deliver function of the NR RLC device refers to a function of immediately transferring RLC SDUs, received from a lower layer, to a higher layer in any order. The out-of sequence delivery function may include a function of reassembling RLC SDUs which are segmented from an originally single RLC SDU, and transferring an RLC SDU, and may include a function of storing an RLC SN or PDCP SN of received RLC PDUs, performing reordering, and recording lost RLC PDUs.

The NR MAC layer 4-15 and 4-30 may be connected to a plurality of NR RLC layer devices configured for a single UE, and the main functions of the NR MAC may include some of the following functions.

Mapping (Mapping between logical channels and transport channels)

Multiplexing/demultiplexing (Multiplexing/demultiplexing of MAC SDUs)

Scheduling information reporting

HARQ (Error correction through HARQ)

Priority handling between logical channels (Priority handling between logical channels of one UE)

Priority handling between UEs (Priority handling between UEs by means of dynamic scheduling)

MBMS service identification

Transport format selection

Padding

The NR PHY layer 4-20 and 4-25 may perform an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

Figure 5:
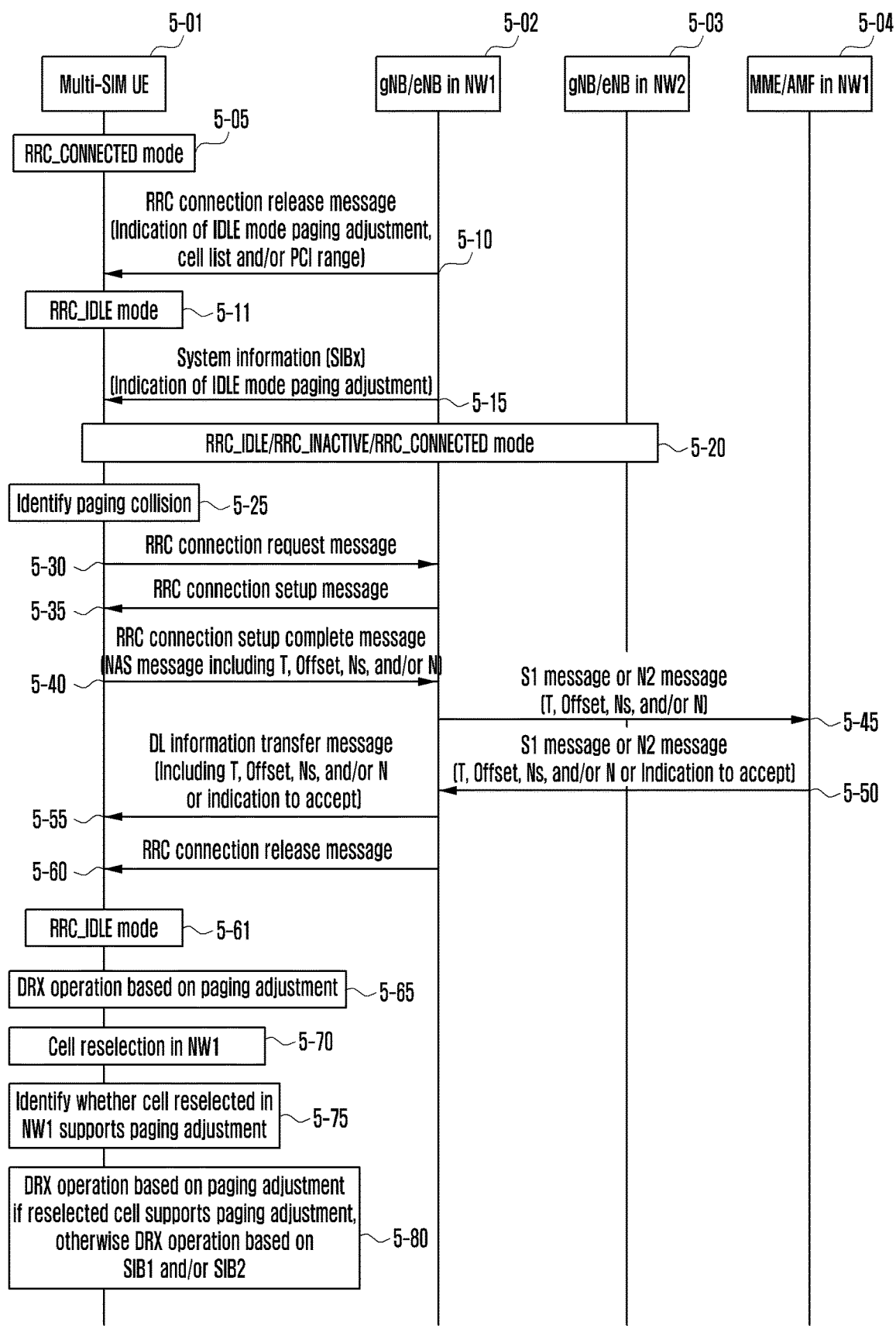
FIG. 5 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

FIG. 5 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

The multi-SIM UE according to an embodiment of the disclosure may be a UE that supports two or more SIMs. The multi-SIM UE may operate in a first mode (hereinafter, a dual SIM dual standby (DSDS) mode) or a second mode (hereinafter, a dual SIM dual active (DSDA) mode). The DSDS mode and the DSDA mode can be defined as follows.

DSDS: Both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained.

DSDA: Both SIMs can be used in both idle and connected modes. Each SIM has a dedicated transceiver, meaning that there are no interdependencies on idle or connected mode operation at the modem level.

A paging collision according to an embodiment of the disclosure may be defined as follows.

The paging collision may be a case in which a resource for an operation having to be performed in NW1 (network 1) and a resource for an operation having to be performed in NW2 overlap (or collide) in time or frequency.

For example, it can be said that the paging collision occurs when paging opportunities or time points (paging occasions) that the multi-SIM UE should monitor in the NW1 and the NW2 partially or entirely overlap, when an NW1 paging frame (PF) and an NW2 PF belong to the same radio frame, when the radio frames partially overlap, when it is required to transmit/receive data in the NW2 in case of having to receive a paging signal or a short message in the NW1, or when it is required to perform another idle mode operation (i.e., RRM measurements and/or system information reception) in the NW2 in case of having to receive a paging signal or a short message in the NW1.

In an embodiment of the disclosure, for convenience of description, it is considered that the multi-SIM UE performs a paging adjustment procedure from the NW1. However, when both the NW1 and the NW2 support the paging adjustment procedure, the UE may select either the NW1 or the NW2 to perform the paging adjustment procedure.

With reference to FIG. 5, at step 5-05, a multi-SIM UE 5-01 may be in an RRC connected mode (RRC_CONNECTED) by establishing an RRC connection with the NW1 5-02.

If the UE 5-01 that transmits and receives data in the RRC connected mode does not transmit or receive data for a predetermined reason or for a certain time, the NW1 5-02 may transmit an RRC connection release message to the UE 5-01 at step 5-10.

For example, when a base station located in the NW1 5-02 is an LTE base station (eNB), the base station may transmit an RRCConnectionRelease message that does not contain rrc-InactiveConfig. When a base station located in the NW1 5-02 is an NR base station (gNB), the base station may transmit an RRCRelease message that does not contain suspendConfig.

It is proposed in the disclosure that the above message (e.g., the RRCConnectionRelease message or the RRCRelease message) may include an indication or information element indicating whether paging adjustment is supported. Alternatively, the above message (e.g., the RRCConnectionRelease message or the RRCRelease message) may include a cell list or PCI range that supports paging adjustment.

Upon receiving the RRC connection release message, the UE 5-01 may transition to an RRC idle mode (RRC_IDLE) at step 5-11.

The UE transitioning to the RRC idle mode may find a suitable cell through a cell selection procedure or a cell reselection procedure, camp on, and receive system information from the NW1 5-02 at step 5-15.

It is proposed in the disclosure that the system information may include an indication or information element indicating whether a cell supports paging adjustment. For example, if the system information includes the indicator or information element indicating that the cell supports paging adjustment, the UE 5-01 being in the RRC idle mode may determine that a paging adjustment procedure can be performed for the NW1 5-02.

At step 5-20, the multi-SIM UE 5-01 may be in the RRC connected mode by establishing the RRC connection with the NW2 5-03, or in the RRC idle mode or an RRC inactive mode (RRC_INACTIVE) by not establishing the RRC connection.

At step 5-25, the multi-SIM UE 5-01 may determine that a paging collision will occur from the NW1 and the NW2.

When the indication or information element indicating whether the paging adjustment is supported is included in the system information at the step 5-15, the UE 5-01 may perform an RRC connection establishment procedure with the NW1 5-02 so as to adjust a paging occasion.

Alternatively, when the currently camping cell is included in the cell list or PCI range that supports the paging adjustment at the step 5-10, the UE 5-01 may perform the RRC connection establishment procedure with the NW 5-02 so as to adjust a paging occasion.

First, at step 5-30, the UE 5-01 may transmit an RRC connection request message (RRCConnectionRequest in LTE or RRCSetupRequest in NR) to the NW1 5-02. This message may include at least one of information such as an identifier of the UE (ue-Identity) or cause for establishing the RRC connection (establishmentCause). In the disclosure, it is proposed to introduce a new establishmentCause.

In one example, the UE may transmit, to the NW1 5-02, the RRC connection request message that includes a new cause value (e.g., PagingOccasionRequest) indicating that the UE will perform the RRC connection establishment procedure with the NW1 5-02 for the paging adjustment procedure. Alternatively, the UE may transmit, to the NW1 5-02, the RRC connection request message including the existing establishmentCause (e.g., mo-Signallling).

Upon receiving the RRC connection request message, the NW1 5-02 may transmit an RRC connection setup message (RRCConnectionSetup in LTE or RRCSetup in NR) to the UE 5-01 at step 5-35.

Upon receiving the RRC connection setup message, the UE 5-01 may transmit an RRC connection setup complete message (RRCConnectionSetupComplete in LTE or RRCSetupComplete in NR) to the NW1 5-02 at step 5-40. Meanwhile, the RRC connection setup complete message may include a NAS message. In the disclosure, it is proposed that at least one of the followings may be included in the NAS message.

DRX cycle value (DRX cycle parameter T)

Offset indicating a difference between a starting point of a paging occasion that the UE 5-01 should currently monitor based on system information (e.g., SIB1) broadcast in a cell currently camping on the NW1 and a starting point of a paging occasion that the UE 5-01 actually wants.

The unit of the offset may be a radio frame, a subframe, an OFDM symbol, or a time slot.

When the NW1 is an LTE network, the offset may be applied as (SFN+Offset) mod T=(T div N)*(UE_ID mod N), or SFN mod T=(T div N)*(UE_ID mod N)+Offset, or SFN mod T=(T div N)*(UE_ID mod N)−Offset, and i_s=floor(UE_ID/N) mod Ns may be equally applied as defined in the 36.304 standard document. In this case, values included in SIB1 or SIB2 may be applied to N and Ns.

When the NW1 is an NR network, the offset may be applied by replacing PF_offset provided in SIB1 (e.g., (SFN+Offset) mod T=(T div N)*(UE_ID mod N)), or applied as an additional offset (e.g., (SFN+PF_offset+Offset) mod T=(T div N)*(UE_ID mod N) or (SFN+PF_offset) mod T=(T div N)*(UE_ID mod N)+Offset)), and i_s=floor(UE_ID/N) mod Ns may be equally applied as defined in the 38.304 standard document. In this case, values included in SIB1 may be applied to the remaining variables such as N and Ns.

Additionally, it may include N (the number of paging frames per DRX cycle) and/or Ns (the number of paging occasions per paging frame) values desired by the UE 5-01.

Additionally, it may include a first-PDCCH-MonitoringOccasionOfPO value (a value indicating the first PDCCH monitoring occasion of a paging occasion for a paging frame).

At step 5-45, the NW1 5-02 may transmit, to an MME or AMF 5-04, an S1 message or N2 message including the NAS message included in the RRC connection setup complete message. When a base station located in the NW1 5-02 is an LTE base station, the base station may transmit the S1 message to the MME, and when a base station located in the NW1 5-02 is an NR base station, the base station may transmit the N2 message to the AMF. The S1 message or N2 message may refer to a service request message, a registration request message, an attach request message, or a TAU request message.

At step 5-50, the MME or AMF 5-04 may transmit an S1 message or N2 message to the NW1 5-02. This S1 message or N2 message may refer to a service accept message, a registration accept message, an attach accept message, or a TAU accept message. In the disclosure, it is proposed that the above message may include at least one of the followings.

Negotiated DRX parameters, that is, DRX cycle value (DRX cycle parameter T)

Negotiated Offset value as described at the step 5-40

Negotiated N and/or Ns values as described at the step 5-40

Negotiated first-PDCCH-MonitoringOccasionOfPO value as described at the step 5-40

An indication to accept, modify, or reject the paging adjustment requested by the UE At step 5-55, the NW1 5-02 may transmit a DL information transfer message (DLInformationTransfer message) to the UE 5-01. The DL information transfer message may include the S1 message or N2 message received at the step 5-50.

At step 5-60, the NW1 5-02 may transmit an RRC connection release message to the UE 5-01 being in the RRC connected mode. Upon receiving the RRC connection release message, the UE 5-01 may transition to the RRC idle mode at step 5-61.

At step 5-65, the UE 5-01 being in the RRC idle mode may perform a DRX operation by applying DRX configuration information contained in the NAS message included in the RRC connection setup complete message of the step 5-40. Alternatively, it is possible to perform the DRX operation by applying the DRX configuration information based on the information received at the step 5-55.

At step 5-70, the UE 5-01 being in the RRC idle mode may select a new cell by performing a cell reselection process in the NW1 5-02.

At step 5-75, the UE 5-01 may identify whether an indication or information element indicating the support of paging adjustment is included in the system information broadcast in the newly selected cell. Alternatively, the UE 5-01 may identify whether an indication or information element indicating the support of paging adjustment is included at the step 5-10 or 5-60, or identify whether the newly selected cell is included in the cell list or PCI range that supports paging adjustment.

If it is determined at the step 5-75 that paging adjustment is supported, the UE may perform paging monitoring/short message monitoring at step 5-80, based on the paging occasion adjusted as at the step 5-65. Otherwise, the UE may perform short message monitoring/paging monitoring based on SIB1/SIB2 broadcast in the newly selected cell.

Figure 6:
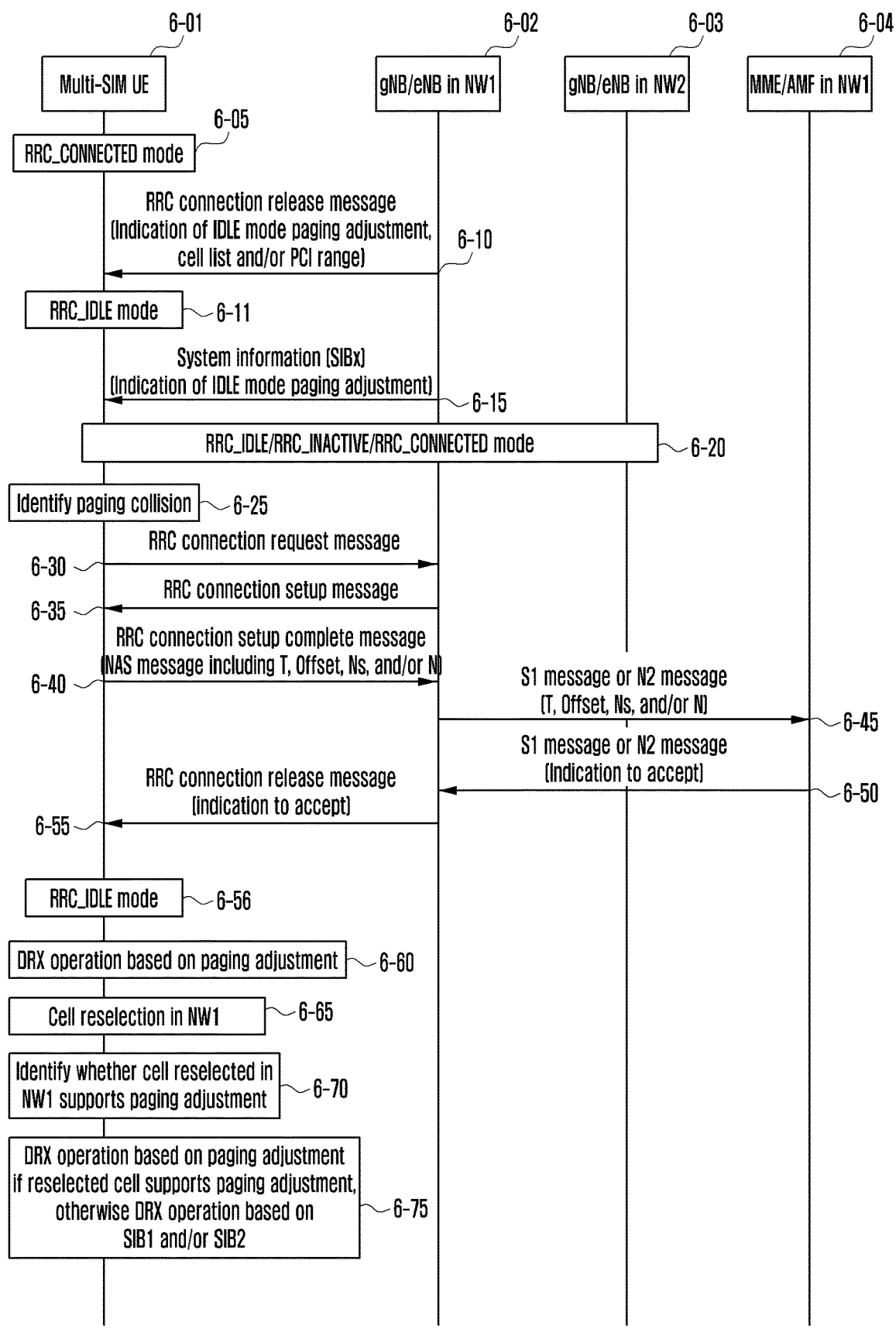
FIG. 6 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

FIG. 6 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

The multi-SIM UE according to an embodiment of the disclosure may be a UE that supports two or more SIMs. The multi-SIM UE may operate in a dual SIM dual standby (DSDS) mode or a dual SIM dual active (DSDA) mode. The DSDS mode and the DSDA mode can be defined as follows.

- DSDS: Both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained.
- DSDA: Both SIMs can be used in both idle and connected modes. Each SIM has a dedicated transceiver, meaning that there are no interdependencies on idle or connected mode operation at the modem level.

A paging collision according to an embodiment of the disclosure may be defined as follows.

The paging collision may be a case in which a resource for an operation having to be performed in NW1 (network 1) and a resource for an operation having to be performed in NW2 overlap (or collide) in time or frequency.

For example, it can be said that the paging collision occurs when paging opportunities or time points (paging occasions) that the multi-SIM UE should monitor in the NW1 and the NW2 partially or entirely overlap, when an NW1 paging frame (PF) and an NW2 PF belong to the same radio frame, when the radio frames partially overlap, when it is required to transmit/receive data in the NW2 in case of having to receive a paging signal or a short message in the NW1, or when it is required to perform another idle mode operation (i.e., RRM measurements and/or system information reception) in the NW2 in case of having to receive a paging signal or a short message in the NW1.

In an embodiment of the disclosure, for convenience of description, it is considered that the multi-SIM UE performs a paging adjustment procedure from the NW1. However, when both the NW1 and the NW2 support the paging adjustment procedure, the UE may select either the NW1 or the NW2 to perform the paging adjustment procedure.

With reference to FIG. 6, at step 6-05, a multi-SIM UE 6-01 may be in an RRC connected mode (RRC_CONNECTED) by establishing an RRC connection with the NW1 6-02.

If the UE 6-01 that transmits and receives data in the RRC connected mode does not transmit or receive data for a predetermined reason or for a certain time, the NW1 6-02 may transmit an RRC connection release message to the UE 6-01 at step 6-10.

For example, when a base station located in the NW1 6-02 is an LTE base station (eNB), the base station may transmit an RRCConnectionRelease message that does not contain rrc-InactiveConfig. When a base station located in the NW1 6-02 is an NR base station (gNB), the base station may transmit an RRCRelease message that does not contain suspendConfig.

It is proposed in the disclosure that the above message may include an indication or information element indicating whether paging adjustment is supported. Alternatively, the above message may include a cell list or PCI range that supports paging adjustment.

Upon receiving the RRC connection release message, the UE 6-01 may transition to an RRC idle mode (RRC_IDLE) at step 6-11.

The UE transitioning to the RRC idle mode may find a suitable cell through a cell selection procedure or a cell reselection procedure, camp on, and receive system information from the NW1 6-02 at step 6-15.

It is proposed in the disclosure that the system information may include an indication or information element (e.g., the cell list or PCI range that supports paging adjustment) indicating whether a cell supports paging adjustment. For example, if the system information includes the indicator or information element indicating that the cell supports paging adjustment, the UE 6-01 being in the RRC idle mode may determine that a paging adjustment procedure can be performed for the NW1 6-02.

At step 6-20, the multi-SIM UE 6-01 may be in the RRC connected mode by establishing the RRC connection with the NW2 6-03, or in the RRC idle mode or an RRC inactive mode (RRC_INACTIVE) by not establishing the RRC connection.

At step 6-25, the multi-SIM UE 6-01 may determine that a paging collision will occur from the NW1 and the NW2.

When the indication or information element indicating whether the paging adjustment is supported is included in the system information at the step 6-15, the UE 6-01 may perform an RRC connection establishment procedure with the NW1 6-02 so as to adjust a paging occasion.

Alternatively, when the currently camping cell is included in the cell list or PCI range that supports the paging adjustment at the step 6-10, the UE 6-01 may perform the RRC connection establishment procedure with the NW 6-02 so as to adjust a paging occasion.

First, at step 6-30, the UE 6-01 may transmit an RRC connection request message (RRCConnectionRequest in LTE or RRCSetupRequest in NR) to the NW1 6-02. This message may include at least one of information such as an identifier of the UE (ue-Identity) or cause for establishing the RRC connection (establishmentCause). In the disclosure, it is proposed to introduce a new establishmentCause.

In one example, the UE may transmit, to the NW1 6-02, the RRC connection request message that includes a new cause value (e.g., PagingOccasionRequest) indicating that the UE will perform the RRC connection establishment procedure with the NW1 6-02 for the paging adjustment procedure. Alternatively, the UE may transmit, to the NW1 6-02, the RRC connection request message including the existing establishmentCause (e.g., mo-Signallling).

Upon receiving the RRC connection request message, the NW1 6-02 may transmit an RRC connection setup message (RRCConnectionSetup in LTE or RRCSetup in NR) to the UE 6-01 at step 6-35.

Upon receiving the RRC connection setup message, the UE 6-01 may transmit an RRC connection setup complete message (RRCConnectionSetupComplete in LTE or RRCSetupComplete in NR) to the NW1 6-02 at step 6-40. Meanwhile, the RRC connection setup complete message may include a NAS message. In the disclosure, it is proposed that at least one of the followings may be included in the NAS message.

- DRX cycle value (DRX cycle parameter T)
- Offset indicating a difference between a starting point of a paging occasion that the UE 6-01 should currently monitor based on system information (e.g., SIB1) broadcast in a cell currently camping on the NW1 and a starting point of a paging occasion that the UE 6-01 actually wants.
- The unit of the offset may be a radio frame, a subframe, an OFDM symbol, or a time slot.
- When the NW1 is an LTE network, the offset may be applied as (SFN+Offset) mod T=(T div N)*(UE_ID mod N), or SFN mod T=(T div N)*(UE_ID mod N)+Offset, or SFN mod T=(T div N)*(UE_ID mod N)−Offset, and i_s=floor(UE_ID/N) mod Ns may be equally applied as defined in the 36.304 standard document. In this case, values included in SIB1 or SIB2 may be applied to N and Ns.
- When the NW1 is an NR network, the offset may be applied by replacing PF_offset provided in SIB1 (e.g., (SFN+Offset) mod T=(T div N)*(UE_ID mod N)), or applied as an additional offset (e.g., (SFN+PF_offset+Offset) mod T=(T div N)*(UE_ID mod N) or (SFN+PF_offset) mod T=(T div N)*(UE_ID mod N)+Offset)), and i_s=floor(UE_ID/N) mod Ns may be equally applied as defined in the 38.304 standard document. In this case, values included in SIB1 may be applied to the remaining variables such as N and Ns.
- Additionally, it may include N and/or Ns values desired by the UE 6-01.
- Additionally, it may include a first-PDCCH-MonitoringOccasionOfPO value.

At step 6-45, the NW1 6-02 may transmit, to an MME or AMF 6-04, an S1 message or N2 message including the NAS message included in the RRC connection setup complete message. When a base station located in the NW1 6-02 is an LTE base station, the base station may transmit the S1 message to the MME, and when a base station located in the NW1 6-02 is an NR base station, the base station may transmit the N2 message to the AMF. The S1 message or N2 message may refer to a service request message, a registration request message, an attach request message, or a TAU request message.

At step 6-50, the MME or AMF 6-04 may transmit an S1 message or N2 message to the NW1 6-02. This S1 message or N2 message may refer to a service accept message, a registration accept message, an attach accept message, or a TAU accept message. In the disclosure, it is proposed that the above message may include at least one of the followings.

- Negotiated DRX parameters, that is, DRX cycle value (DRX cycle parameter T)
- Negotiated Offset value as described at the step 6-40
- Negotiated N and/or Ns values as described at the step 6-40
- Negotiated first-PDCCH-MonitoringOccasionOfPO value as described at the step 6-40
- An indication to accept, modify, or reject the paging adjustment requested by the UE At step 6-55, the NW1 6-02 may transmit an RRC connection release message to the UE 6-01 being in the RRC connected mode. Upon receiving the RRC connection release message, the UE 6-01 may transition to the RRC idle mode at step 6-56. This message may include the indication to accept, modify, or reject the paging adjustment requested by the UE.

At step 6-60, the UE 6-01 being in the RRC idle mode may perform a DRX operation by applying DRX configuration information contained in the NAS message included in the RRC connection setup complete message of the step 6-40. Alternatively, it is possible to perform the DRX operation by applying the DRX configuration information based on the information received at the step 6-55.

At step 6-65, the UE 6-01 being in the RRC idle mode may select a new cell by performing a cell reselection process in the NW1 6-02.

At step 6-70, the UE 6-01 may identify whether an indication or information element indicating the support of paging adjustment is included in the system information broadcast in the newly selected cell. Alternatively, the UE 6-01 may identify whether an indication or information element indicating the support of paging adjustment is included at the step 6-10 or 6-55, or identify whether the newly selected cell is included in the cell list or PCI range that supports paging adjustment.

If it is determined at the step 6-70 that paging adjustment is supported, the UE may perform paging monitoring/short message monitoring at step 6-80, based on the paging occasion adjusted as at the step 6-60. Otherwise, the UE may perform short message monitoring/paging monitoring based on SIB1/SIB2 broadcast in the newly selected cell.

Figure 7:
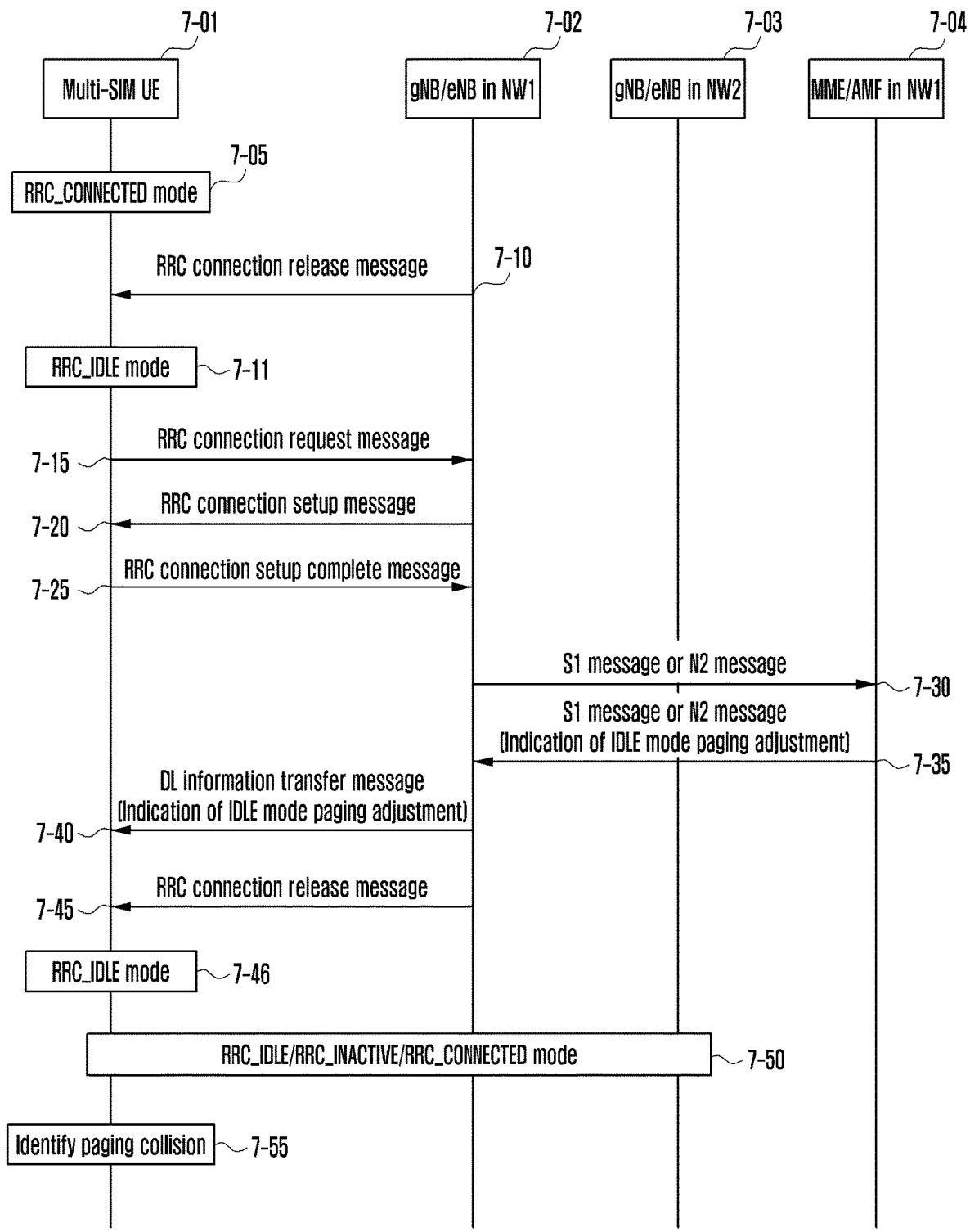
FIG. 7 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

FIG. 7 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

The multi-SIM UE according to an embodiment of the disclosure may be a UE that supports two or more SIMs. The multi-SIM UE may operate in a dual SIM dual standby (DSDS) mode or a dual SIM dual active (DSDA) mode. The DSDS mode and the DSDA mode can be defined as follows.

DSDS: Both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained.

DSDA: Both SIMs can be used in both idle and connected modes. Each SIM has a dedicated transceiver, meaning that there are no interdependencies on idle or connected mode operation at the modem level.

A paging collision according to an embodiment of the disclosure may be defined as follows.

The paging collision may be a case in which a resource for an operation having to be performed in NW1 (network 1) and a resource for an operation having to be performed in NW2 overlap in time or frequency.

For example, it can be said that the paging collision occurs when paging opportunities or time points (paging occasions) that the multi-SIM UE should monitor in the NW1 and the NW2 partially or entirely overlap, when an NW1 paging frame (PF) and an NW2 PF belong to the same radio frame, when the radio frames partially overlap, when it is required to transmit/receive data in the NW2 in case of having to receive a paging signal or a short message in the NW1, or when it is required to perform another idle mode operation (i.e., RRM measurements and/or system information reception) in the NW2 in case of having to receive a paging signal or a short message in the NW1.

In an embodiment of the disclosure, for convenience of description, it is considered that the multi-SIM UE performs a paging adjustment procedure from the NW1. However, when both the NW1 and the NW2 support the paging adjustment procedure, the UE may select either the NW1 or the NW2 to perform the paging adjustment procedure.

With reference to FIG. 7, at step 7-05, a multi-SIM UE 7-01 may be in an RRC connected mode (RRC_CONNECTED) by establishing an RRC connection with the NW1 7-02.

If the UE 7-01 that transmits and receives data in the RRC connected mode does not transmit or receive data for a predetermined reason or for a certain time, the NW1 7-02 may transmit an RRC connection release message to the UE 7-01 at step 7-10. For example, when a base station located in the NW1 7-02 is an LTE base station (eNB), the base station may transmit an RRCConnectionRelease message that does not contain rrc-InactiveConfig. When a base station located in the NW1 7-02 is an NR base station (gNB), the base station may transmit an RRCRelease message that does not contain suspendConfig.

Upon receiving the RRC connection release message, the UE 7-01 may transition to an RRC idle mode (RRC_IDLE) at step 7-11.

The UE transitioning to the RRC idle mode may find a suitable cell through a cell selection procedure or a cell reselection procedure, camp on, and receive system information from the NW1 7-02.

The UE 7-01 may perform an RRC connection establishment procedure with the NW1 7-02. First, at step 7-15, the UE 7-01 may transmit an RRC connection request message (RRCConnectionRequest in LTE or RRCSetupRequest in NR) to the NW1 7-02. This message may include at least one of information such as an identifier of the UE (ue-Identity) or cause for establishing the RRC connection (establishmentCause).

Upon receiving the RRC connection request message, the NW 7-02 may transmit an RRC connection setup message (RRCConnectionSetup in LTE or RRCSetup in NR) to the UE 7-01 at step 7-20.

Upon receiving the RRC connection setup message, the UE 7-01 may transmit an RRC connection setup complete message (RRCConnectionSetupComplete in LTE or RRCSetupComplete in NR) to the NW1 7-02 at step 7-25. The RRC connection setup complete message may include a NAS message.

At step 7-30, the NW1 7-02 may transmit, to an MME or AMF 7-04, an S1 message or N2 message including the NAS message included in the RRC connection setup complete message. When a base station located in the NW1 7-02 is an LTE base station, the base station may transmit the S1 message to the MME, and when a base station located in the NW1 7-02 is an NR base station, the base station may transmit the N2 message to the AMF. The S1 message or N2 message may refer to a service request message, a registration request message, an attach request message, or a TAU request message.

At step 7-35, the MME or AMF 7-04 may transmit an S1 message or N2 message to the NW1 7-02. This S1 message or N2 message may refer to a service accept message, a registration accept message, an attach accept message, or a TAU accept message. In the disclosure, it is proposed that the above message may include an indication or information element indicating whether paging adjustment is supported. Alternatively, a cell list, PCI range, or TAU list that supports paging adjustment may be included.

At step 7-40, the NW1 7-02 may transmit a DL information transfer message (DLInformationTransfer message) to the UE 7-01. The DL information transfer message may include the S1 message or N2 message received at the step 7-35.

At step 7-45, the NW1 7-02 may transmit an RRC connection release message to the UE 7-01 being in the RRC connected mode. Upon receiving the RRC connection release message, the UE 7-01 may transition to the RRC idle mode at step 7-46.

At step 7-50, the multi-SIM UE 7-01 may be in the RRC connected mode by establishing the RRC connection with the NW2 7-03, or in the RRC idle mode or an RRC inactive mode (RRC_INACTIVE) by not establishing the RRC connection.

At step 7-55, the multi-SIM UE 7-01 may determine that a paging collision will occur from the NW1 and the NW2.

The subsequent paging occasion adjustment procedure and the DRX operation of the UE are the same as in the above-described embodiments.

Figure 8:
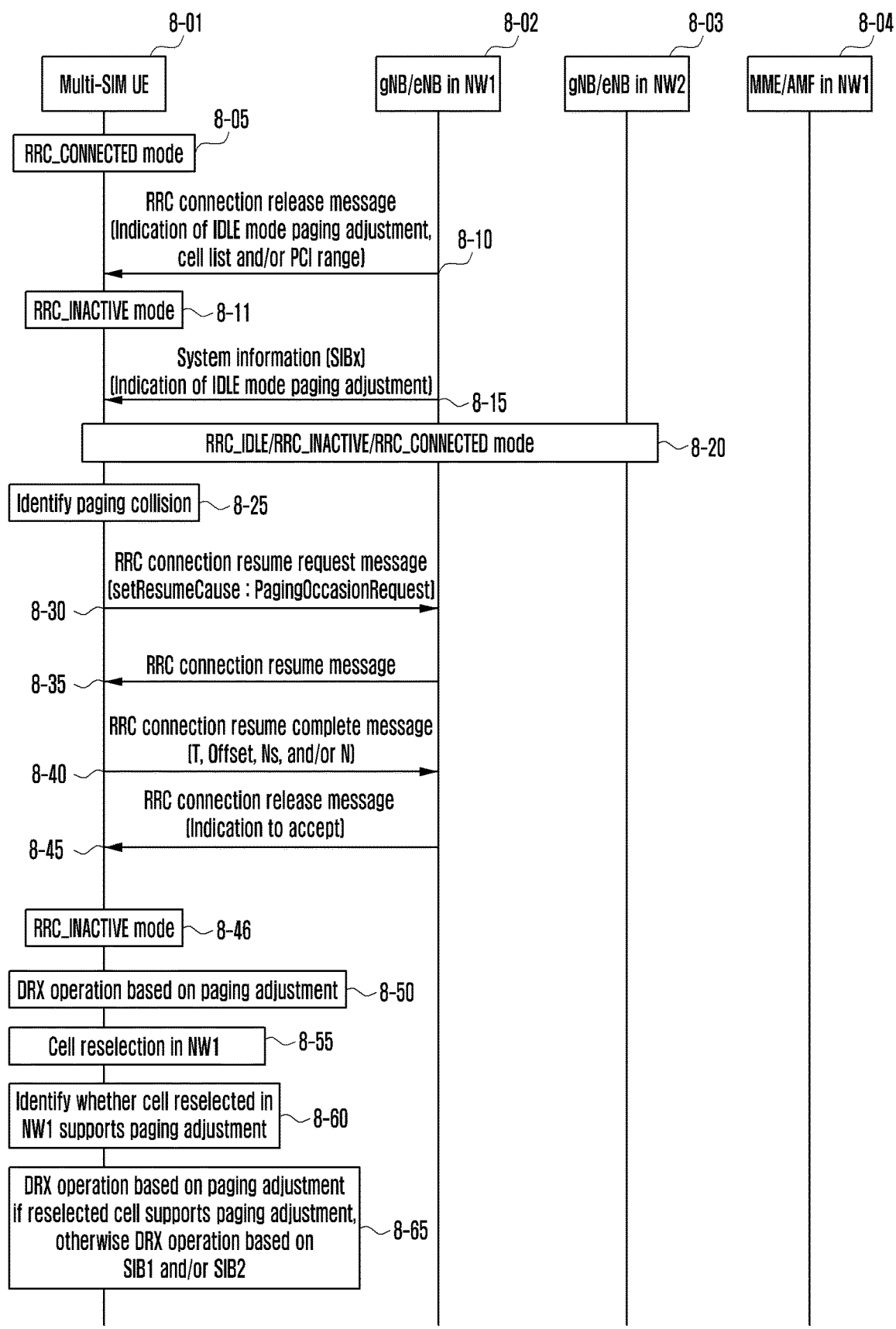
FIG. 8 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

FIG. 8 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

The multi-SIM UE according to an embodiment of the disclosure may be a UE that supports two or more SIMs. The multi-SIM UE may operate in a dual SIM dual standby (DSDS) mode or a dual SIM dual active (DSDA) mode. The DSDS mode and the DSDA mode can be defined as follows.

DSDS: Both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained.

DSDA: Both SIMs can be used in both idle and connected modes. Each SIM has a dedicated transceiver, meaning that there are no interdependencies on idle or connected mode operation at the modem level.

A paging collision according to an embodiment of the disclosure may be defined as follows.

The paging collision may be a case in which a resource for an operation having to be performed in NW1 (network 1) and a resource for an operation having to be performed in NW2 overlap in time or frequency.

For example, it can be said that the paging collision occurs when paging opportunities or time points (paging occasions) that the multi-SIM UE should monitor in the NW1 and the NW2 partially or entirely overlap, when an NW1 paging frame (PF) and an NW2 PF belong to the same radio frame, when the radio frames partially overlap, when it is required to transmit/receive data in the NW2 in case of having to receive a paging signal or a short message in the NW1, or when it is required to perform another idle mode operation (i.e., RRM measurements and/or system information reception) in the NW2 in case of having to receive a paging signal or a short message in the NW1.

In an embodiment of the disclosure, for convenience of description, it is considered that the multi-SIM UE performs a paging adjustment procedure from the NW1. However, when both the NW1 and the NW2 support the paging adjustment procedure, the UE may select either the NW1 or the NW2 to perform the paging adjustment procedure.

With reference to FIG. 8, at step 8-05, a multi-SIM UE 8-01 may be in an RRC connected mode (RRC_CONNECTED) by establishing an RRC connection with the NW1 8-02.

If the UE 8-01 that transmits and receives data in the RRC connected mode does not transmit or receive data for a predetermined reason or for a certain time, the NW1 8-02 may transmit an RRC connection release message to the UE 8-01 at step 8-10. For example, when a base station located in the NW1 8-02 is an LTE base station (eNB), the base station may transmit an RRCConnectionRelease message that contains rrc-InactiveConfig. When a base station located in the NW1 8-02 is an NR base station (gNB), the base station may transmit an RRCRelease message that contains suspendConfig.

It is proposed in the disclosure that the above message may include an indication or information element indicating whether paging adjustment is supported. Alternatively, the above message may include a cell list or PCI range that supports paging adjustment.

Upon receiving the RRC connection release message, the UE 8-01 may transition to an RRC inactive mode (RRC_INACTIVE) at step 8-11.

The UE transitioning to the RRC inactive mode may find a suitable cell through a cell selection procedure or a cell reselection procedure, camp on, and receive system information from the NW1 8-02 at step 8-15. In the disclosure, the system information may include an indication or information element (e.g., a cell list or PCI range that supports paging adjustment) indicating whether a cell supports paging adjustment. For example, if the system information includes the indicator or information element indicating that the cell supports paging adjustment, the UE 8-01 being in the RRC inactive mode may determine that a paging adjustment procedure can be performed with the NW1 8-02.

At step 8-20, the multi-SIM UE 8-01 may be in the RRC connected mode by establishing the RRC connection with the NW2 8-03, or in the RRC idle mode or an RRC inactive mode (RRC_INACTIVE) by not establishing the RRC connection.

At step 8-25, the multi-SIM UE 8-01 may determine that a paging collision will occur from the NW1 and the NW2.

When the indication or information element indicating whether the paging adjustment is supported is included in the system information at the step 8-10 or the step 8-15, the UE 8-01 may perform an RRC connection resume procedure with the NW1 8-02 so as to adjust a paging occasion.

First, at step 8-30, the UE 8-01 may transmit an RRC connection resume request message (RRCConnectionResumeRequest in LTE or RRCResumeRequest in NR) to the NW1 8-02. This message may include at least one of information such as an identifier of the UE (ue-Identity) or cause for resuming the RRC connection (resumeCause). In the disclosure, it is proposed to introduce a new resumeCause.

In one example, the UE may transmit, to the NW1 8-02, the RRC connection resume request message that includes a new cause value (e.g., PagingOccasionRequest) indicating that the UE will perform the RRC connection resume procedure with the NW1 8-02 for the paging adjustment procedure. Alternatively, the UE may transmit, to the NW1 8-02, the RRC connection resume request message including the existing resumeCause (e.g., mo-Signallling).

Upon receiving the RRC connection resume request message, the NW1 8-02 may transmit an RRC connection resume message (RRCConnectionResume in LTE or RRCResume in NR) to the UE 8-01 at step 8-35.

Upon receiving the RRC connection resume message, the UE 8-01 may transmit an RRC connection resume complete message (RRCConnectionResumeComplete in LTE or RRCResumeComplete in NR) to the NW1 8-02 at step 8-40. The RRC connection resume complete message may include at least one of the followings.

DRX cycle value (DRX cycle parameter T)

Offset indicating a difference between a starting point of a paging occasion that the UE 8-01 should currently monitor based on system information (e.g., SIB1) broadcast in a cell currently camping on the NW1 and a starting point of a paging occasion that the UE 8-01 actually wants.

The unit of the offset may be a radio frame, a subframe, an OFDM symbol, or a time slot.

When the NW1 is an LTE network, the offset may be applied as (SFN+Offset) mod T=(T div N)*(UE_ID mod N), or SFN mod T=(T div N)*(UE_ID mod N)+Offset, or SFN mod T=(T div N)*(UE_ID mod N)−Offset, and i_s=floor(UE_ID/N) mod Ns may be equally applied as defined in the 36.304 standard document. In this case, values included in SIB1 or SIB2 may be applied to N and Ns.

When the NW1 is an NR network, the offset may be applied by replacing PF_offset provided in SIB1 (e.g., (SFN+Offset) mod T=(T div N)*(UE_ID mod N)), or applied as an additional offset (e.g., (SFN+PF_offset+Offset) mod T=(T div N)*(UE_ID mod N) or (SFN+PF_offset) mod T=(T div N)*(UE_ID mod N)+Offset)), and i_s=floor(UE_ID/N) mod Ns may be equally applied as defined in the 38.304 standard document. In this case, values included in SIB1 may be applied to the remaining variables such as N and Ns.

Additionally, it may include N and/or Ns values desired by the UE 8-01.

Additionally, it may include a first-PDCCH-MonitoringOccasionOfPO value.

At step 8-45, the NW1 8-02 may transmit an RRC connection release message to the UE 8-01. Upon receiving the RRC connection release message, the UE 8-01 may transition to the RRC inactive mode at step 8-46. The RRC connection release message may include at least one of the followings.

Negotiated DRX parameters, that is, DRX cycle value (DRX cycle parameter T)

Negotiated Offset value as described at the step 8-40

Negotiated N and/or Ns values as described at the step 8-40

Negotiated first-PDCCH-MonitoringOccasionOfPO value as described at the step 8-40

An indication to accept, modify, or reject the paging adjustment requested by the UE At step 8-50, the UE 8-01 being in the RRC inactive mode may perform a DRX operation by applying DRX configuration information included in the RRC connection resume complete message of the step 8-40. Alternatively, it is possible to perform the DRX operation by applying the DRX configuration information received at the step 8-45.

At step 8-55, the UE 8-01 being in the RRC inactive mode may select a new cell by performing a cell reselection process in the NW1 8-02.

At step 8-60, the UE 8-01 may identify whether an indication or information element indicating the support of paging adjustment is included in the system information broadcast in the newly selected cell. Alternatively, the UE 8-01 may identify whether an indication or information element indicating the support of paging adjustment is included at the step 8-10 or 8-45, or identify whether the newly selected cell is included in the cell list or PCI range that supports paging adjustment.

If it is determined at the step 8-60 that paging adjustment is supported, the UE may perform paging monitoring/short message monitoring at step 8-65, based on the paging occasion adjusted as at the step 8-50. Otherwise, the UE may perform short message monitoring/paging monitoring based on information included at the step 8-45 and/or information included in SIB1/SIB2 in the newly selected cell.

Figure 9:
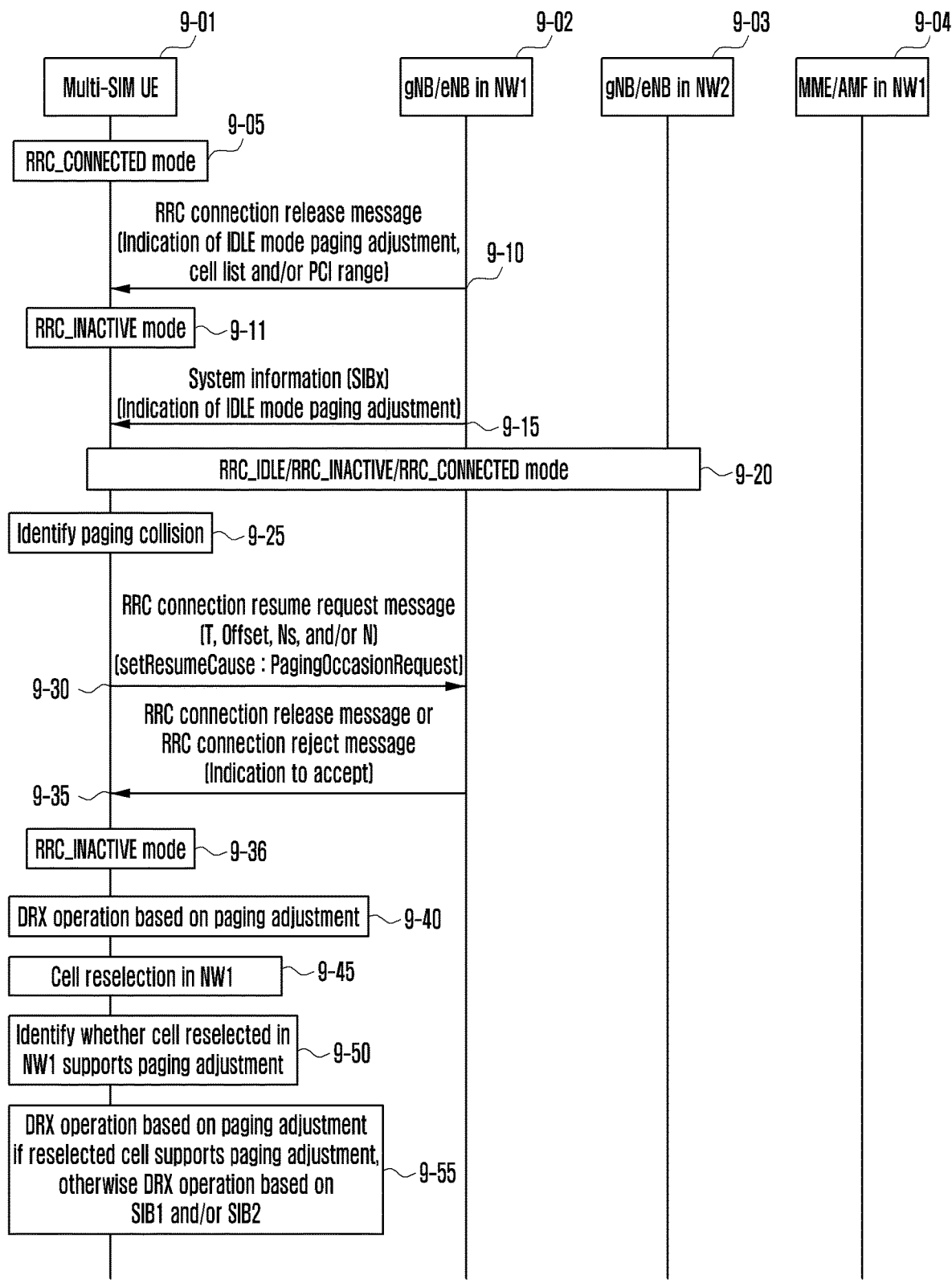
FIG. 9 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

FIG. 9 is a flow diagram illustrating a process in which a multi-SIM UE supporting a plurality of subscriber identity modules (SIMs) requests adjustment of paging occasion to one of a plurality of networks (NWs) so as to prevent a paging collision, according to an embodiment of the disclosure.

The multi-SIM UE according to an embodiment of the disclosure may be a UE that supports two or more SIMs. The multi-SIM UE may operate in a dual SIM dual standby (DSDS) mode or a dual SIM dual active (DSDA) mode. The DSDS mode and the DSDA mode can be defined as follows.

DSDS: Both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained.

DSDA: Both SIMs can be used in both idle and connected modes. Each SIM has a dedicated transceiver, meaning that there are no interdependencies on idle or connected mode operation at the modem level.

A paging collision according to an embodiment of the disclosure may be defined as follows.

The paging collision may be a case in which a resource for an operation having to be performed in NW1 (network 1) and a resource for an operation having to be performed in NW2 overlap in time or frequency.

For example, it can be said that the paging collision occurs when paging occasions that the multi-SIM UE should monitor in the NW1 and the NW2 partially or entirely overlap, when an NW1 paging frame (PF) and an NW2 PF belong to the same radio frame, when the radio frames partially overlap, when it is required to transmit/receive data in the NW2 in case of having to receive a paging signal or a short message in the NW1, or when it is required to perform another idle mode operation (i.e., RRM measurements and/or system information reception) in the NW2 in case of having to receive a paging signal or a short message in the NW1.

In an embodiment of the disclosure, for convenience of description, it is considered that the multi-SIM UE performs a paging adjustment procedure from the NW1. However, when both the NW1 and the NW2 support the paging adjustment procedure, the UE may select either the NW1 or the NW2 to perform the paging adjustment procedure.

With reference to FIG. 9, at step 9-05, a multi-SIM UE 9-01 may be in an RRC connected mode (RRC_CONNECTED) by establishing an RRC connection with the NW1 9-02.

If the UE 9-01 that transmits and receives data in the RRC connected mode does not transmit or receive data for a predetermined reason or for a certain time, the NW1 9-02 may transmit an RRC connection release message to the UE 9-01 at step 9-10.

For example, when a base station located in the NW1 9-02 is an LTE base station (eNB), the base station may transmit an RRCConnectionRelease message that contains rrc-InactiveConfig. When a base station located in the NW1 9-02 is an NR base station (gNB), the base station may transmit an RRCRelease message that contains suspendConfig. It is proposed in the disclosure that the above message may include an indication or information element indicating whether paging adjustment is supported. Alternatively, the above message may include a cell list or PCI range that supports paging adjustment.

Upon receiving the RRC connection release message, the UE 9-01 may transition to an RRC inactive mode (RRC_INACTIVE) at step 9-11.

The UE transitioning to the RRC inactive mode may find a suitable cell through a cell selection procedure or a cell reselection procedure, camp on, and receive system information from the NW1 9-02 at step 9-15. In the disclosure, the system information may include an indication or information element (e.g., a cell list or PCI range that supports paging adjustment) indicating whether a cell supports paging adjustment. For example, if the system information includes the indicator or information element indicating that the cell supports paging adjustment, the UE 9-01 being in the RRC inactive mode may determine that a paging adjustment procedure can be performed with the NW1 9-02.

At step 9-20, the multi-SIM UE 9-01 may be in the RRC connected mode by establishing the RRC connection with the NW2 9-03, or in the RRC idle mode or an RRC inactive mode (RRC_INACTIVE) by not establishing the RRC connection.

At step 9-25, the multi-SIM UE 9-01 may determine that a paging collision will occur from the NW1 and the NW2.

When the indication or information element indicating whether the paging adjustment is supported is included in the system information or message received at the step 9-10 or the step 9-15, the UE 9-01 may perform an RRC connection resume procedure with the NW1 9-02 so as to adjust a paging occasion.

First, at step 9-30, the UE 9-01 may transmit an RRC connection resume request message (RRCConnectionResumeRequest in LTE or RRCResumeRequest in NR) to the NW1 9-02. This message may include at least one of information such as an identifier of the UE (ue-Identity) or cause for resuming the RRC connection (resumeCause).

In the disclosure, it is proposed to introduce a new resumeCause. In one example, the UE may transmit, to the NW1 9-02, the RRC connection resume request message that includes a new cause value (e.g., PagingOccasionRequest) indicating that the UE will perform the RRC connection resume procedure with the NW1 9-02 for the paging adjustment procedure. Alternatively, the UE may transmit, to the NW1 9-02, the RRC connection resume request message including the existing resumeCause (e.g., mo-Signallling). Alternatively, the RRC connection resume request message may include at least one of the followings.

DRX cycle value (DRX cycle parameter T)

Offset indicating a difference between a starting point of a paging occasion that the UE 9-01 should currently monitor based on system information (e.g., SIB1) broadcast in a cell currently camping on the NW1 and a starting point of a paging occasion that the UE 9-01 actually wants.

The unit of the offset may be a radio frame, a subframe, an OFDM symbol, or a time slot.

When the NW1 is an LTE network, the offset may be applied as (SFN+Offset) mod T=(T div N)*(UE_ID mod N), or SFN mod T=(T div N)*(UE_ID mod N)+Offset, or SFN mod T=(T div N)*(UE_ID mod N)−Offset, and i_s=floor(UE_ID/N) mod Ns may be equally applied as defined in the 36.304 standard document. In this case, values included in SIB1 or SIB2 may be applied to N and Ns.

When the NW1 is an NR network, the offset may be applied by replacing PF_offset provided in SIB1 (e.g., (SFN+Offset) mod T=(T div N)*(UE_ID mod N)), or applied as an additional offset (e.g., (SFN+PF_offset+Offset) mod T=(T div N)*(UE_ID mod N) or (SFN+PF_offset) mod T=(T div N)*(UE_ID mod N)+Offset)), and i_s=floor(UE_ID/N) mod Ns may be equally applied as defined in the 38.304 standard document. In this case, values included in SIB1 may be applied to the remaining variables such as N and Ns.

Additionally, it may include N and/or Ns values desired by the UE 9-01.

Additionally, it may include a first-PDCCH-MonitoringOccasionOfPO value.

Upon receiving the RRC connection resume request message, the NW1 9-02 may transmit an RRC connection release message or an RRC connection reject message (RRCConnectionReject in LTE or RRCReject in NR) to the UE 9-01 at step 9-35. Upon receiving the RRC connection release message or the RRC connection reject message, the UE 9-01 may transition to the RRC inactive mode at step 9-36. The RRC connection release message or the RRC connection reject message may include at least one of the followings.

Negotiated DRX parameters, that is, DRX cycle value (DRX cycle parameter T)

Negotiated Offset value as described at the step 9-40

Negotiated N and/or Ns values as described at the step 9-40

Negotiated first-PDCCH-MonitoringOccasionOfPO value as described at the step 9-40

An indication to accept, modify, or reject the paging adjustment requested by the UE At step 9-40, the UE 9-01 being in the RRC inactive mode may perform a DRX operation by applying DRX configuration information included in the RRC connection resume request message of the step 9-30. Alternatively, it is possible to perform the DRX operation by applying the DRX configuration information received at the step 9-35.

At step 9-45, the UE 9-01 being in the RRC inactive mode may select a new cell by performing a cell reselection process in the NW1 9-02.

At step 9-50, the UE 9-01 may identify whether an indication or information element indicating the support of paging adjustment is included in the system information broadcast in the newly selected cell. Alternatively, the UE 9-01 may identify whether an indication or information element indicating the support of paging adjustment is included in the message or information received at the step 9-10 or 9-35, or identify whether the newly selected cell is included in the cell list or PCI range the supports paging adjustment.

If it is determined at the step 9-50 that paging adjustment is supported, the UE may perform paging monitoring/short message monitoring at step 9-55, based on the paging occasion adjusted as at the step 9-40. Otherwise, the UE may perform short message monitoring/paging monitoring based on information included at the step 9-35 and/or information included in SIB1/SIB2 broadcast in the newly selected cell.

Figure 10:
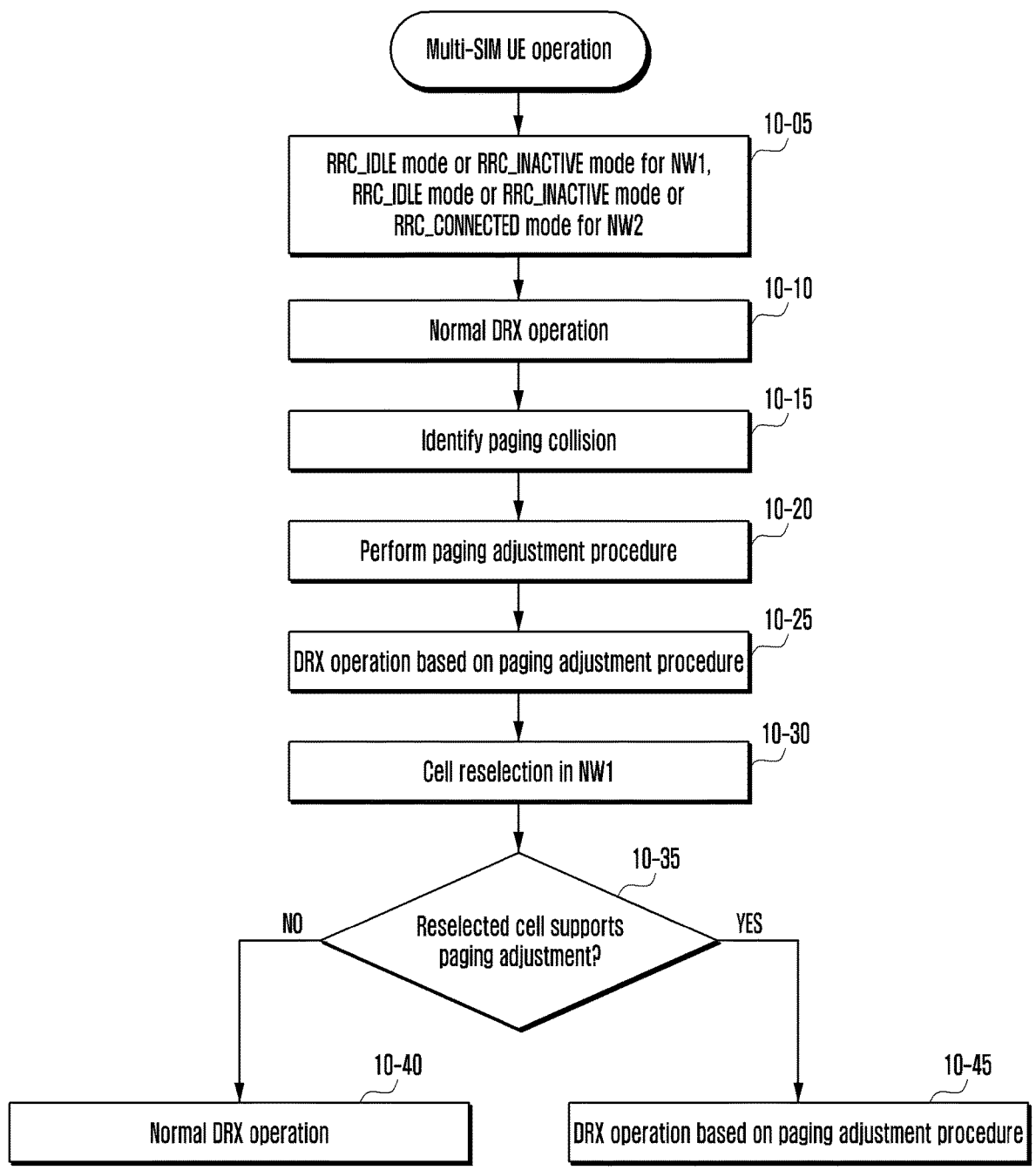
FIG. 10 is a flow diagram illustrating a process in which a multi-SIM UE supporting a plurality of subscriber identity modules (SIMs) performs a discontinuous reception (DRX) operation so as to receive a paging message or a short message, according to an embodiment of the disclosure.

FIG. 10 is a flow diagram illustrating a process in which a multi-SIM UE supporting a plurality of subscriber identity modules (SIMs) performs a discontinuous reception (DRX) operation so as to receive a paging message or a short message, according to an embodiment of the disclosure.

At step 10-05, the multi-SIM UE does not establish an RRC connection with the NW1 and thus may be in the RRC idle mode (RRC_IDLE) or the RRC inactive mode (RRC_INACTIVE). At this time, the UE may be in the RRC connected mode (RRC_CONNECTED), the RRC idle mode, or the RRC inactive mode with the NW2.

At step 10-10, the UE may perform a normal DRX operation. The DRX operation is a method of improving power consumption by periodically monitoring a paging message or short message rather than always monitoring it. That is, the UE may attempt to receive the paging message or short message by periodically performing a reception operation only for a specific time interval, and this is referred to as discontinuous reception (DRX).

When the UE performs the DRX operation in LTE at the step 10-10, it is performed through Equations 1 and 2 below. SFN increases by 1 for every radio frame. When a paging signal is transmitted in a radio frame that satisfies the corresponding equation, the UE performs a reception operation based on the DRX. The radio frame is referred to as a paging frame (PF).

$$\text{SFN mod } T = (T \text{ div } N)*(\text{UE\_ID mod } N) \qquad \text{Equation 1}$$

where,

SFN: System Frame Number. 10 bits (MSB 8 bits explicit, LBS 2 bits implicit)

T: DRX cycle of the UE. Transmitted on SIB2. ENUMERATED {rf32, rf64, rf128, rf256} nB: Transmitted on SIB2. ENUMERATED {4T, 2T, T, T/2, T/4, T/8, T/16, T/32, T/64, T/128, T/256}

N: min (T, nB)

Ns: max(1, nB/T)

UE_ID: IMSI mod 1024 (IMSI is a unique number assigned to each UE)

In MIB (Master Information Block) of PBCH (Physical Broadcast Channel), 8 bits indicate SFN. T and nB are values included in SIB2 (System Information Block type 2) and provided from a base station. T may have one of {rf32, rf64, rf128, rf256}, and r32 represents a length of 32 radio frames. That is, r32 means 320 ms. The T value actually applied in the above equation is derived through coordination among the UE, the base station, and the MME. The base station provides a default DRX value to the UE by using SIB1 which is one of broadcast system information. If the UE desires a shorter DRX cycle than the default DRX value, the UE provides a desired DRX value (UE-specific DRX value) to the MME through the ATTACH process. When there is paging for the UE, the MME transmits the UE-specific DRX value, provided from the UE, together with the paging to the base station. The UE determines, as a DRX cycle, the shorter value between the UE-specific DRX value transmitted to the MME and the default DRX value provided from the base station. The base station as well determines, as a DRX cycle, the shorter value between the UE-specific DRX value received from the MME and the default DRX value being broadcasted by the base station. Such a DRX cycle value becomes an actual T value applied in the above equation. Therefore, the UE and the base station select the same DRX cycle, and the base station determines the PF based on the DRX cycle and then transmits paging to the UE.

In case of an LTE system, a subframe capable of delivering paging is determined in one PF. This is called a paging subframe. The UE monitors its own actual paging in one paging subframe of the PF derived from the above equation. This one paging subframe is called a paging occasion (PO). The PO is derived through the following equation.

$$i\_s = \text{floor}(UE\_ID/N) \bmod Ns \quad \text{Equation 2}$$

Using the i_s value calculated via the above equation, the UE can obtain its own PO from Table 1 below.

TABLE 1

| | FDD: | | | |
|---|---|---|---|---|
| Ns | PO when i_s = 0 | PO when i_s = 1 | PO when i_s = 2 | PO when i_s = 3 |
| 1 | 9 | N/A | N/A | N/A |
| 2 | 4 | 9 | N/A | N/A |
| 4 | 0 | 4 | 5 | 9 |
| | TDD (all UL/DL configurations): | | | |
| Ns | PO when i_s = 0 | PO when i_s = 1 | PO when i_s = 2 | PO when i_s = 3 |
| 1 | 0 | N/A | N/A | N/A |
| 2 | 0 | 5 | N/A | N/A |
| 4 | 0 | 1 | 5 | 6 |

In case of a next-generation mobile communication system, paging timing may be referred to as a paging occasion (PO). The PO means a set of PDCCH monitoring occasions and may be composed of a plurality of time slots in which paging DCI is transmitted (e.g., the slots may be subframes or OFDM symbols). In the next-generation mobile communication system, the DRX operation of UEs is performed through Equations 3 and 4 below. SFN increases by 1 for every radio frame. When a paging signal is transmitted in a radio frame that satisfies the corresponding equation, the UE performs a reception operation based on the DRX. The radio frame is referred to as a paging frame (PF). The PF may include one or a plurality of POs or may include a starting point of the PO (firstPDCCH-MonitoringOccasionOfPO). The PO associated with the PF may start from the PF or may start from a radio frame after the PF.

Calculation of PF for Paging Signal $$(SFN + PF\_offset) \bmod T = (T \text{ div } N) * (UE\_ID \bmod N) \quad \text{Equation 3}$$

Calculation of PO for Paging Signal $$i\_s = \text{floor}(UE\_ID/N) \bmod Ns \quad \text{Equation 4}$$

where,

SFN: System Frame Number. 10 bits (The most significant bit (MSB) of the 10-bit SFN is in systemFrameNumber in MIB and the 4 LSB of the SFN are conveyed in the PBCH transport block as part of channel coding)

T: DRX cycle of the UE

N: number of total paging frames in T

Ns: number of paging occasions for a PF. ENUMERATED {four, two, one}

PF_offset: offset used for PF determination

UE_ID: 5G-S-TMSI mod 1024

The values of firstPDCCH-MonitoringOccasionofPO, nAndPagingFrameOffset, and default DRX Cycle can be provided in SIB1. From nAndPagingFrameOffset, the UE can derive the parameters N and PF_offset.

If the UE does not have 5G-S-TMSI, the UE may derive PF and i_s by setting UE_ID to 0 in Equations 3 and 4 above. PDCCH monitoring occasions for a paging signal may be determined by pagingSearchSpace and firstPDCCH-MonitoringOccasionOfPO when firstPDCCH-MonitoringOccasionOfPO is included in SIB1. Otherwise, that is, when SearchSpaceId is configured to 0 in pagingSearchSpace, the PDCCH monitoring occasions for the paging signal may be the same as RMSI (or SIB1) defined in Chapter 13 of 3GPP TS 38.213. Specifically, when SearchSpaceId is configured to 0 in pagingSearchSpace, the Ns value may be 1 or 2. When Ns is 1, only one PO may exist in the PF, and one PO may start from the first PDCCH monitoring occasion. When Ns is 2, one PO may exist in the PF, and the PO may exist in the first half frame in the PF when i_s derived by Equation 4 is 0, and exist in the second half frame in the PF when i_s derived by Equation 4 is 1. When SearchSpaceId other than 0 is configured for pagingSearchSpace, the UE may monitor the $(i\_s+1)^{th}$ PO by using the i_s value derived by Equation 4. In this case, the PO is a set of 'S' consecutive PDCCH monitoring occasions where 'S' is the number of actual transmitted SSBs determined according to ssb-PositionInBurst in SIB1. The $K^{th}$ PDCCH monitoring occasion for paging in the PO corresponds to the $K^{th}$ transmitted SSB. The PDCCH monitoring occasions for paging which do not overlap with UL symbols are sequentially numbered from zero starting from the first PDCCH monitoring occasion in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter. Otherwise, it is equal to i_s*S.

At step 10-15, the multi-SIM UE may determine that a paging collision from the NW1 and the NW2 will occur.

At step 10-20, the multi-SIM UE may perform a paging adjustment procedure with the NW1. The paging adjustment procedure may follow the above-described embodiment.

At step 10-25, the multi-SIM UE may perform a DRX operation based on the paging adjustment procedure performed at the step 10-20. At this time, the UE may perform the DRX operation by applying DRX configuration information received through the paging adjustment procedure. For example, if T (DRX Cycle value) is configured through the paging adjustment procedure, T may be applied based on the corresponding value. Alternatively, the T value may be applied as written in the existing 38.304 or 36.304 document (T is determined by the shortest of the UE specific DRX value(s), if configured by RRC and/or upper layers, and a default DRX value broadcast in system information. If UE specific DRX is not configured by RRC or by upper layers, the default value is applied). Alternatively, when the NW1 is an LTE system, the multi-SIM UE may perform the DRX operation by applying Equations 5 and 6, and DRX parameters may be applied based on the paging adjustment procedure.

$$(SFN+Offset) \bmod T = (T \text{ div } N)*(UE\_ID \bmod N), \text{ or}$$
$$SFN \bmod T = (T \text{ div } N)*(UE\_ID \bmod N) + Offset,$$
$$\text{or } SFN \bmod T = (T \text{ div } N)*(UE\_ID \bmod N) - Offset \qquad \text{Equation 5}$$

$$i\_s = \text{floor}(UE\_ID/N) \bmod Ns \qquad \text{Equation 6}$$

Alternatively, when the NW1 is an NR system, the multi-SIM UE may perform the DRX operation by applying Equations 7 and 8, and DRX parameters may be applied based on the paging adjustment procedure.

$$(SFN+Offset) \bmod T = (T \text{ div } N)*(UE\_ID \bmod N), \text{ or}$$
$$(SFN+PF\_offset+Offset) \bmod T = (T \text{ div } N)*$$
$$(UE\_ID \bmod N), \text{ or } (SFN+PF\_offset) \bmod T = (T \text{ div } N)*(UE\_ID \bmod N) + Offset) \qquad \text{Equation 7}$$

$$i\_s = \text{floor}(UE\_ID/N) \bmod Ns \qquad \text{Equation 8}$$

At step 10-30, the multi-SIM UE may select a new cell by performing a cell reselection process in the NW1.

At step 10-35, the UE may determine whether the newly selected cell supports paging adjustment.

If the newly selected cell does not support paging adjustment, the UE may perform at step 10-40 the normal DRX operation earlier described at the step 10-10. If the newly selected cell supports paging adjustment, the UE may perform at step 10-45 the DRX operation earlier described at the step 10-25.

Figure 11:
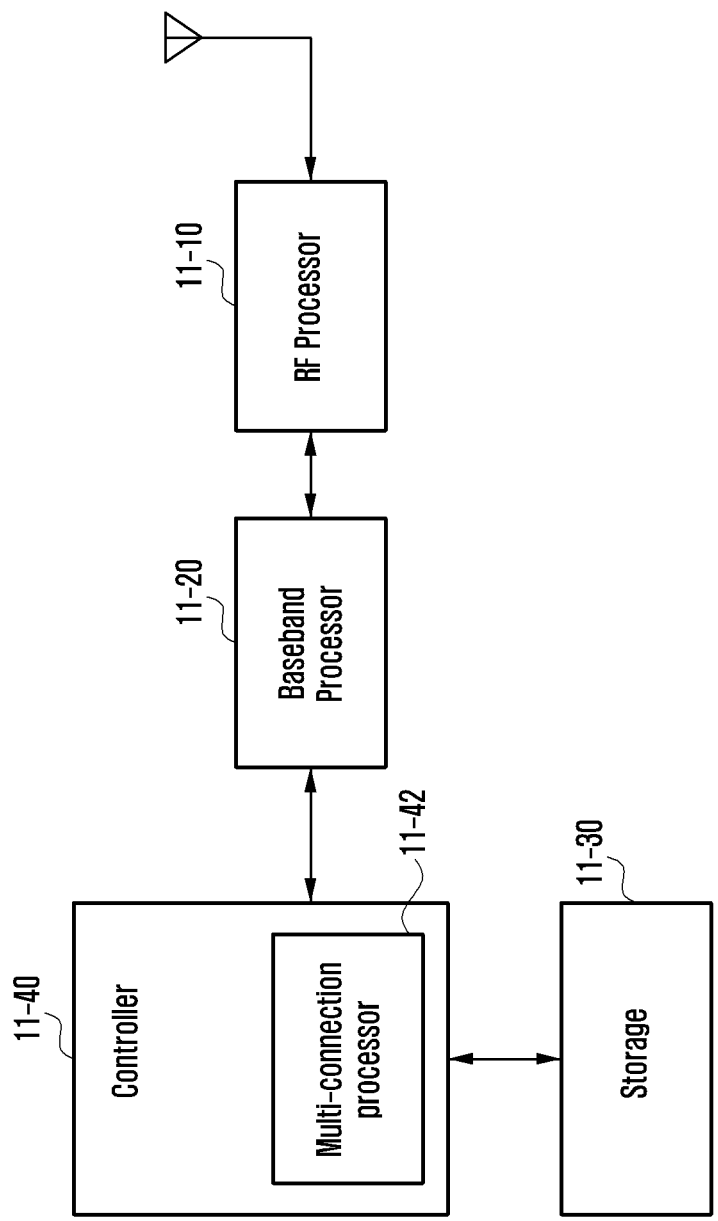
FIG. 11 is a block diagram illustrating a structure of a UE according to an embodiment of the disclosure.

FIG. 11 is a block diagram illustrating a structure of a UE according to an embodiment of the disclosure.

As illustrated, the UE includes a radio frequency (RF) processor 11-10, a baseband processor 11-20, a storage 11-30, and a controller 11-40.

The RF processor 11-10 performs a function for transmitting or receiving a signal via a wireless channel, such as band conversion and amplification of the signal. That is, the RF processor 11-10 up-converts a baseband signal provided from the baseband processor 11-20 into an RF band signal, transmits the RF band signal via an antenna, and down-converts an RF band signal received via the antenna into a baseband signal. For example, the RF processor 11-10 may include a transmission filter, a reception filter, an amplifier, a mixer, an oscillator, a digital-to-analog convertor (DAC), an analog-to-digital convertor (ADC), and the like. Although only one antenna is illustrated in the drawing, the UE may include a plurality of antennas. In addition, the RF processor 11-10 may include a plurality of RF chains. Moreover, the RF processor 11-10 may perform beamforming. For the beamforming, the RF processor 11-10 may control the phase and magnitude of each signal transmitted or received via a plurality of antennas or antenna elements. In addition, the RF processor may perform MIMO, and may receive a plurality of layers while performing the MIMO operation.

The baseband processor 11-20 performs a function for a conversion between a baseband signal and a bit stream in accordance with the physical layer standard of a system. For example, in case of data transmission, the baseband processor 11-20 generates complex symbols by encoding and modulating a transmission bit stream. Also, in case of data reception, the baseband processor 11-20 reconstructs a reception bit stream by demodulating and decoding a baseband signal provided from the RF processor 11-10. In an example according to an orthogonal frequency division multiplexing (OFDM) scheme, in case of data transmission, the baseband processor 11-20 generates complex symbols by encoding and modulating a transmission bit stream, maps the complex symbols to subcarriers, and then configures OFDM symbols via an inverse fast Fourier transform (IFFT) operation and cyclic prefix (CP) insertion. Also, in case of data reception, the baseband processor 11-20 divides a baseband signal provided from the RF processor 11-10 in the unit of OFDM symbols, reconstructs signals mapped to the subcarriers via a fast Fourier transform (FFT) operation, and then reconstructs a reception bit stream via demodulation and decoding.

The baseband processor 11-20 and the RF processor 11-10 transmit or receive a signal, as described above. Accordingly, the baseband processor 11-20 and the RF processor 11-10 may be referred to as a transmitter, a receiver, a transceiver, or a communication unit. In addition, at least one of the baseband processor 11-20 and the RF processor 11-10 may include a plurality of communication modules so as to support many different radio access technologies. In addition, at least one of the baseband processor 11-20 and the RF processor 11-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band and a millimeter wave (e.g., 60 GHz) band.

The storage 11-30 stores a default program, an application program, and data such as configuration information for the operation of the UE. In particular, the storage 11-30 may store information related to a second access node that performs wireless communication using a second radio access technology. In addition, the storage 11-30 provides stored data in response to a request of the controller 11-40.

The controller 11-40 controls the overall operation of the UE. For example, the controller 11-40 transmits or receives a signal via the baseband processor 11-20 and the RF processor 11-10. In addition, the controller 11-40 writes and reads data to and from the storage 11-30. To this end, the controller 11-40 may include at least one processor. For example, the controller 11-40 may include a communication processor (CP) that performs control for communication, and an application processor (AP) that controls a higher layer such as an application program.

Figure 12:
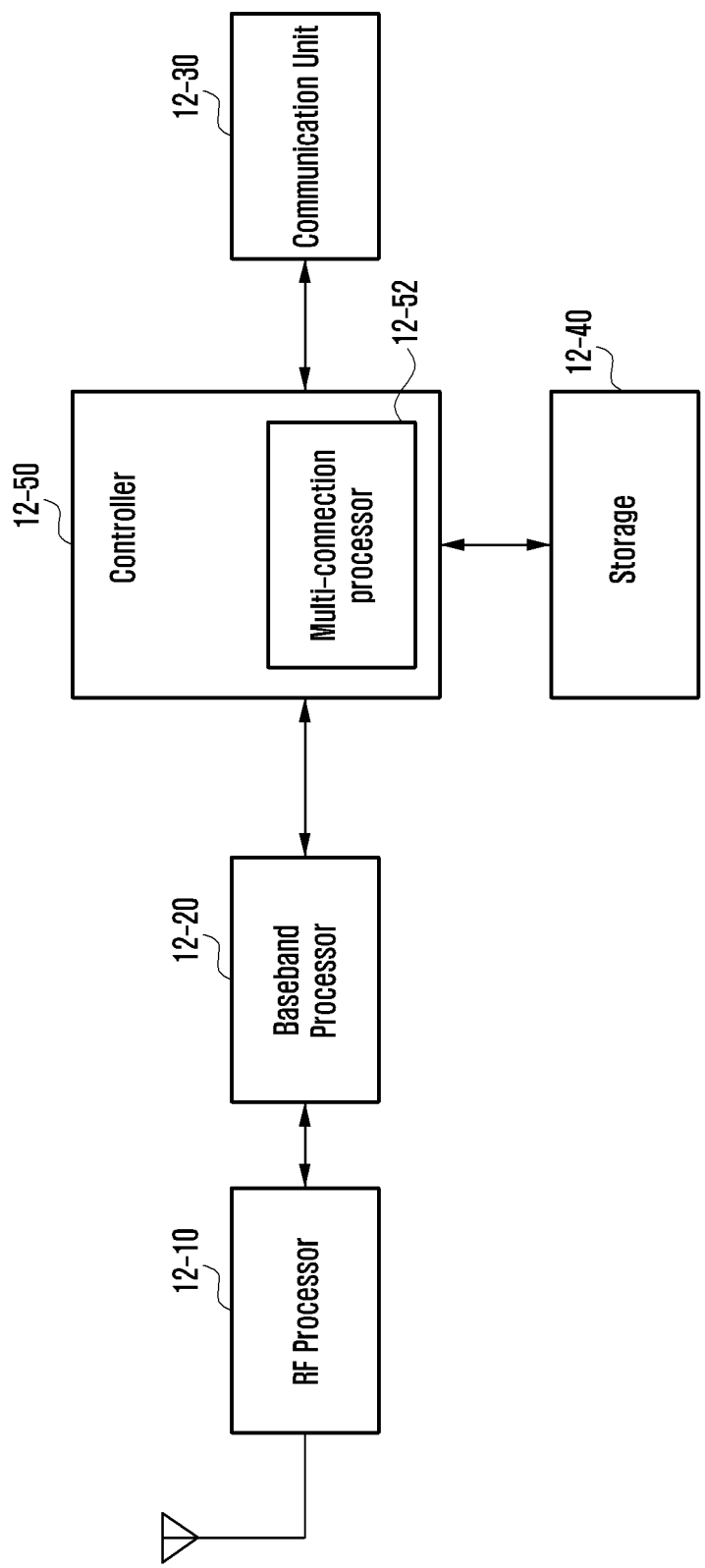
FIG. 12 is a block diagram illustrating a structure of a base station in a wireless communication system according to an embodiment of the disclosure.

FIG. 12 is a block diagram illustrating a structure of a base station in a wireless communication system according to an embodiment of the disclosure.

As illustrated, the base station includes an RF processor 12-10, a baseband processor 12-20, a backhaul communication unit 12-30, a storage 12-40, and a controller 12-50.

The RF processor 12-10 performs a function for transmitting or receiving a signal via a wireless channel, such as band conversion and amplification of the signal. For example, the RF processor 12-10 up-converts a baseband signal provided from the baseband processor 12-20 into an RF band signal, transmits the RF band signal via an antenna, and down-converts an RF band signal received via the antenna into a baseband signal. For example, the RF processor 12-10 may include a transmission filter, a reception filter, an amplifier, a mixer, an oscillator, a DAC, and an ADC. Although only one antenna is illustrated in the drawing, a first access node may include a plurality of antennas. In addition, the RF processor 12-10 may include a plurality of RF chains. Moreover, the RF processor 12-10 may perform beamforming. For the beamforming, the RF processor 12-10 may control the phase and magnitude of each signal transmitted or received via a plurality of antennas or antenna elements. The RF processor may perform a downlink MIMO operation by transmitting one or more layers.

The baseband processor 12-20 performs a function for converting between a baseband signal and a bit stream in accordance with the physical layer standard of a first radio access technology. For example, in case of data transmission, the baseband processor 12-20 generates complex symbols by encoding and modulating a transmission bit stream. Also, in case of data reception, the baseband processor 12-20 reconstructs a reception bit stream by demodulating and decoding a baseband signal provided from the RF processor 12-10. In an example according to the OFDM scheme, in case of data transmission, the baseband processor 12-20 generates complex symbols by encoding and modulating a transmission bit stream, maps the complex symbols to subcarriers, and then configures OFDM symbols via an IFFT operation and CP insertion. Also, in case of data reception, the baseband processor 12-20 divides a baseband signal provided from the RF processor 12-10 in the unit of OFDM symbols, reconstructs signals mapped to subcarriers via an FFT operation, and then reconstructs a reception bit stream via demodulation and decoding. The baseband processor 12-20 and the RF processor 12-10 transmit or receive a signal, as described above. Accordingly, the baseband processor 12-20 and the RF processor 12-10 may be referred to as a transmitter, a receiver, a transceiver, a communication unit, or a wireless communication unit.

The backhaul communication unit 12-30 provides an interface for performing communication with other nodes in the network. That is, the backhaul communication unit 12-30 converts a bit stream transmitted from a main base station to other node, for example, an auxiliary base station, a core network, etc. into a physical signal, and converts a physical signal received from the other node into a bit stream.

The storage 12-40 stores a default program, an application program, and data such as configuration information for the operation of the main base station. In particular, the storage 12-40 may store information about a bearer allocated to a connected UE, a measurement result reported from the connected UE, and the like. In addition, the storage 12-40 may store information which is a criterion to determine whether to provide or interrupt multiple-access to a UE. Also, the storage 12-40 may provide stored data in response to a request of the controller 12-50.

The controller 12-50 controls the overall operation of the main base station. For example, the controller 12-50 transmits or receives a signal via the baseband processor 12-20 and the RF processor 12-10 or via the backhaul communication unit 12-30. In addition, the controller 12-50 writes and reads data to and from the storage 12-40. To this end, the controller 12-50 may include at least one processor.

Figure 13:
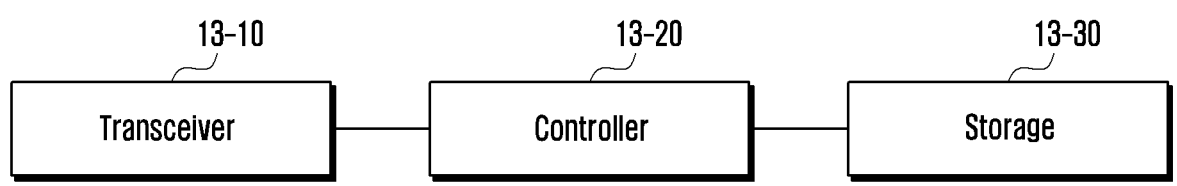
FIG. 13 is a block diagram illustrating a structure of a network entity in a wireless communication system according to an embodiment of the disclosure.

FIG. 13 is a block diagram illustrating a structure of a network entity in a wireless communication system according to an embodiment of the disclosure.

With reference to FIG. 13, the network entity (which may refer to an MME in case of an LTE network, or a network entity performing an access and mobility management function (AMF) in case of an NR network) may include a transceiver 13-10, a controller 13-20, and a storage 13-30.

In the disclosure, the controller may be defined as a circuit, an application-specific integrated circuit, or one processor.

The transceiver 13-10 may include a communication unit or a network interfacing unit, and may transmit/receive a signal to/from any other network entity or a base station (e.g., an eNB of an LTE network or a gNB of an NR network), based on various interfaces.

The controller 13-20 may control the overall operation of the network entity according to the embodiment proposed in the disclosure. For example, the controller 13-20 may control a signal flow between blocks to perform the above-described operation according to the drawing (or flowchart, flow diagram).

The storage 13-30 may store at least one of information transmitted/received through the transceiver 13-10 and information generated through the controller 13-20.

Meanwhile, the network entity according to an embodiment of the disclosure may be implemented as a network function (NF), and the NF may be provided in the form of an instance. In case of being provided as an instance, the NF exists in the form of software code, which may mean an executable state in which physical and/or logical resources are allocated from a computing system to perform the function of the NF in a physical computing system, for example, a specific system existing on a core network. Therefore, the structure of FIG. 13 may mean a physical division or a logical division.

In the drawings for explaining the method of the disclosure, the order of description does not necessarily correspond to the order of execution. The precedence of execution may be changed or the execution may occur in parallel.

Also, in the drawings for explaining the method of the disclosure, some components may be omitted within a range that does not impair the essence of the disclosure.

In the specification and drawings, preferred embodiments of the disclosure have been provided, and specific terms have been used. This is, however, used only in a general sense to easily explain the technical content of the disclosure and help the understanding of the disclosure, and is not intended to limit the scope of the disclosure. Therefore, as will be apparent to those skilled in the art, other modifications based on the technical subject matter of the disclosure may also be implemented in addition to the embodiments disclosed herein.

That is, although specific embodiments have been described in the detailed description of the disclosure, various modifications are possible without departing from the scope of the disclosure. The scope of the disclosure should not be limited to the described embodiments and should be defined by claims below and their equivalents.

The invention claimed is:

1. A method performed by a user equipment (UE) with multiple subscriber identity modules (SIMs) in a communication system, the method comprising:
receiving, from a base station of a cell associated with a SIM among the multiple SIMs, system information including paging related configuration information, wherein the paging related configuration information includes information whether the cell supports an adjustment of paging occasion (PO) associated with the SIM;
in case that the cell is identified to support the adjustment, determining whether a PO collision is detected based on the paging related configuration information;
in case that the PO collision is detected, transmitting, to the base station, a radio resource control (RRC) setup request message including a cause value indicating that the UE requests an RRC connection establishment with the base station for the adjustment of the PO associated with the SIM;
receiving, from the base station, an RRC setup message for establishing the RRC connection based on the cause value; and
transmitting, to the base station, an RRC setup complete message including a registration request message based on an identification that the PO collision is detected.

2. The method of claim 1, further comprising:
receiving, from an access and mobility management function (AMF) entity via the base station, a registration accept message,
wherein the registration accept message includes information used to modify a timing of a paging occasion (PO) associated with the SIM.

3. The method of claim 1,
wherein the paging related configuration information is used to identify a PO associated with the SIM, and
wherein the determination that the PO collision is detected is based on the PO associated with the SIM and a PO associated with a different SIM among the multiple SIMs.

4. A method performed by an access and mobility management function (AMF) entity in a communication system, the method comprising:
receiving, from a user equipment (UE) with multiple subscriber identity modules (SIMs) via a base station of a cell associated with a SIM among the multiple SIMs, a registration request message; and
as a response to the registration request message, transmitting, to the UE via the base station, a registration accept message including adjustment information used to modify a timing of a paging occasion (PO) associated with the SIM,
wherein the registration request message is received based on a determination that a PO collision is detected and a radio resource control (RRC) connection between the UE and the base station established based on a cause value,
wherein the cause value indicates that the UE requests an RRC connection establishment with the base station for an adjustment of the PO associated with the SIM, and
wherein the cell supports the adjustment of the PO associated with the SIM.

5. The method of claim 4,
wherein the determination that the PO collision is detected is based on the PO associated with the SIM and a PO associated with a different SIM among the multiple SIMs.

6. A user equipment (UE) in a communication system, the UE comprising:
multiple subscriber identity modules (SIMs);
a transceiver; and
a controller coupled with the transceiver and configured to:
receive, from a base station of a cell associated with a SIM among the multiple SIMs, system information including paging related configuration information, wherein the paging related configuration information includes information whether the cell supports a paging adjustment procedure associated with the SIM,
in case that the cell is identified to support the adjustment, determine whether a PO collision is detected based on the paging related configuration information,
in case that the PO collision is detected, transmit, to the base station, a radio resource control (RRC) setup request message including cause value indicating that the UE requests an RRC connection establishment with the base station for the paging adjustment procedure,
receive, from the base station, an RRC setup message for establishing the RRC connection based on the cause value, and
transmit, to the base station, an RRC setup complete message including a registration request message based on an identification that the PO collision is detected.

7. The UE of claim 6,
wherein the controller is further configured to:
receive, from an access and mobility management function (AMF) entity via the base station, a registration accept message, and
wherein the registration accept message includes information used to modify a timing of a paging occasion (PO) associated with the SIM.

8. The UE of claim 6,
wherein the paging related configuration information is used to identify a PO associated with the SIM, and
wherein the determination that the PO collision is detected is based on the PO associated with the SIM and a PO associated with a different SIM among the multiple SIMs.

9. An access and mobility management function (AMF) entity in a communication system, the AMF entity comprising:
a transceiver; and
a controller coupled with the transceiver and configured to:
receive, from a user equipment (UE) with multiple subscriber identity modules (SIMs) via a base station of a cell associated with a SIM among the multiple SIMs, a registration request message, and
as a response to the registration request message, transmit, to the UE via the base station, a registration accept message including adjustment information used to modify a timing of a paging occasion (PO) associated with the SIM,
wherein the registration request message is received based on a determination that a PO collision is detected and a radio resource control (RRC) connection between the UE and the base station established based on a cause value, wherein the cause value indicates that the UE requests an RRC connection establishment with the base station for an adjustment of the PO associated with the SIM, and wherein the cell supports the adjustment of the PO associated with the SIM.

10. The AMF entity of claim 9, wherein the determination that the PO collision is detected is based on the PO associated with the SIM and a PO associated with a different SIM among the multiple SIMs.

\* \* \* \* \*